(12) United States Patent
Walrath

(10) Patent No.: US 7,379,977 B2
(45) Date of Patent: May 27, 2008

(54) SYSTEM AND METHOD FOR DISPLAY OF MULTIPLE ELECTRONIC PAGES

(76) Inventor: Steve Walrath, 26440 La Alameda, Suite 110, Mission Viejo, CA (US) 92691

( * ) Notice: Subject to any disclaimer, the term of this patent is extended or adjusted under 35 U.S.C. 154(b) by 487 days.

(21) Appl. No.: 09/912,646

(22) Filed: Jul. 24, 2001

(65) Prior Publication Data

US 2003/0023670 A1 Jan. 30, 2003

(51) Int. Cl.
G06F 15/16 (2006.01)
G06F 17/20 (2006.01)
G06F 17/21 (2006.01)
G06F 17/24 (2006.01)
G06F 17/26 (2006.01)
G06F 17/28 (2006.01)
G06F 3/048 (2006.01)
G06F 15/173 (2006.01)
G06F 17/00 (2006.01)
G06F 17/22 (2006.01)
G06F 17/25 (2006.01)
G06F 17/27 (2006.01)

(52) U.S. Cl. .................. 709/219; 709/203; 709/217; 715/209; 715/234; 715/236; 715/240; 715/768; 715/777; 715/778

(58) Field of Classification Search ................ 709/217, 709/219, 203; 715/503, 513–515, 767–769, 715/777, 778; 705/30, 35, 42

See application file for complete search history.

(56) References Cited

U.S. PATENT DOCUMENTS

| | | | |
|---|---|---|---|
| 4,956,771 A | 9/1990 | Neustaedter | |
| 5,379,374 A | 1/1995 | Ishizaki et al. | |
| 5,392,400 A | 2/1995 | Berkowitz et al. | |
| 5,442,788 A | 8/1995 | Bier | |
| 5,726,669 A | 3/1998 | Obata et al. | |
| 5,742,778 A | 4/1998 | Hao et al. | |
| 5,745,107 A | 4/1998 | Konomi | |
| 5,758,110 A | 5/1998 | Boss et al. | |
| 5,761,419 A | 6/1998 | Schwartz et al. | |
| 5,778,181 A | 7/1998 | Hidary et al. | |
| 5,796,396 A | 8/1998 | Rich | |
| 5,844,553 A | 12/1998 | Hao et al. | |
| 5,872,924 A | 2/1999 | Nakayama et al. | |
| 5,892,909 A | 4/1999 | Grasso et al. | |

(Continued)

OTHER PUBLICATIONS

"MSHTML/DHTML API Overview" MSDN Library, pp. 1-2.*

(Continued)

Primary Examiner—Jason Cardone
Assistant Examiner—Melvin H Pollack
(74) Attorney, Agent, or Firm—Knobbe, Martens, Olson & Bear LLP

(57) ABSTRACT

A system and method for providing a distributed software application is disclosed. The application includes multiple browser window components that run together within a single browser window. Each component manages and displays data independently, so that a series of Internet pages can be simultaneously displayed and manipulated by a user. In one embodiment, an electronic main page is downloaded from a server to a client computer, wherein the main page comprises at least two browser components for displaying additional electronic pages within the main page. The main page includes a user selectable software control for selection of one of the at least two browser components for display.

28 Claims, 18 Drawing Sheets

U.S. PATENT DOCUMENTS

| | | | |
|---|---|---|---|
| 5,897,635 A | 4/1999 | Torres et al. | |
| 5,956,515 A | 9/1999 | Beals et al. | |
| 5,960,173 A | 9/1999 | Tang et al. | |
| 5,961,591 A * | 10/1999 | Jones et al. | 709/217 |
| 6,011,537 A * | 1/2000 | Slotznick | 715/733 |
| 6,035,119 A * | 3/2000 | Massena et al. | 717/100 |
| 6,055,541 A * | 4/2000 | Solecki et al. | 707/103 R |
| 6,065,024 A * | 5/2000 | Renshaw | 715/513 |
| 6,078,921 A * | 6/2000 | Kelley | 707/10 |
| 6,112,239 A * | 8/2000 | Kenner et al. | 709/224 |
| 6,141,413 A * | 10/2000 | Waldner et al. | 379/88.17 |
| 6,239,797 B1 | 5/2001 | Hills et al. | 715/784 |
| 6,249,291 B1 * | 6/2001 | Popp et al. | 345/473 |
| 6,282,551 B1 * | 8/2001 | Anderson et al. | 715/503 |
| 6,330,007 B1 * | 12/2001 | Isreal et al. | 715/762 |
| 6,345,278 B1 * | 2/2002 | Hitchcock et al. | 707/100 |
| 6,421,070 B1 | 7/2002 | Ramos et al. | 715/763 |
| 6,452,609 B1 | 9/2002 | Katinsky et al. | 715/716 |
| 6,724,403 B1 | 4/2004 | Santoro et al. | 715/765 |
| 6,788,316 B1 * | 9/2004 | Ma et al. | 715/760 |
| 6,801,227 B2 * | 10/2004 | Bocionek et al. | 715/777 |
| 6,839,687 B1 | 1/2005 | Dent et al. | 705/40 |
| 6,865,713 B1 | 3/2005 | Bates et al. | 715/512 |
| 6,883,020 B1 | 4/2005 | Taranto et al. | 709/213 |
| 6,912,532 B2 * | 6/2005 | Andersen | 707/10 |
| 6,931,600 B1 * | 8/2005 | Pittman | 715/767 |
| 6,948,134 B2 * | 9/2005 | Gauthier et al. | 715/804 |
| 6,952,799 B2 * | 10/2005 | Edwards et al. | 715/501.1 |
| 7,000,032 B2 * | 2/2006 | Kloba et al. | 709/248 |
| 7,003,726 B2 * | 2/2006 | Walker et al. | 715/717 |
| 7,012,627 B1 * | 3/2006 | Estrada et al. | 715/732 |
| 7,055,095 B1 * | 5/2006 | Anwar | 715/523 |
| 7,069,507 B1 * | 6/2006 | Alcazar et al. | 715/530 |
| 7,134,085 B2 * | 11/2006 | Austin | 715/763 |
| 2001/0047375 A1 * | 11/2001 | Fest | 707/526 |
| 2002/0032611 A1 * | 3/2002 | Khan | 705/26 |
| 2002/0085040 A1 * | 7/2002 | Krolczyk et al. | 345/777 |
| 2002/0091732 A1 * | 7/2002 | Pedro | 707/505 |
| 2002/0095651 A1 * | 7/2002 | Kumar et al. | 717/104 |
| 2002/0099802 A1 * | 7/2002 | Marsh et al. | 709/220 |
| 2002/0112049 A1 * | 8/2002 | Elnozahy et al. | 709/224 |
| 2002/0163545 A1 * | 11/2002 | Hii | 345/838 |
| 2004/0093562 A1 * | 5/2004 | Diorio et al. | 715/513 |
| 2004/0153509 A1 * | 8/2004 | Alcorn et al. | 709/205 |
| 2006/0155728 A1 * | 7/2006 | Bosarge | 707/100 |
| 2006/0184875 A1 * | 8/2006 | Okada et al. | 715/516 |
| 2006/0230356 A1 * | 10/2006 | Sauve et al. | 715/777 |
| 2006/0271858 A1 * | 11/2006 | Yolleck et al. | 715/738 |
| 2007/0067733 A1 * | 3/2007 | Moore et al. | 715/777 |

OTHER PUBLICATIONS

Goodwin, Peggi. "The MSHTML Editing Platform in Internet Explorer 5.5," MSDN Library, Apr. 2000, pp. 1-11.*

"Internet Explorer MSHTML/DHTML API Application Development" MSDN Library, pp. 1-2.*

Raggett, D. "HTML Tables," RFC 1942, May 1996, pp. 1-30.*

"Tabbrowser Extensions Pages," Piro, Date Unknown, pp. 1-13.*

"MSHTML/DHTML API Overview" MSDN Library, pp. 1-2, Jul. 2004.*

"Internet Explorer MSHTML/DHTML API Application Development," MSDN Library, pp. 1-2, Jul. 2004.*

* cited by examiner

SYSTEM AND METHOD FOR DISPLAY OF MULTIPLE ELECTRONIC PAGES

BACKGROUND OF THE INVENTION

1. Field of the Invention

The present invention relates generally to the field of information processing in a distributed computer environment. More particularly, the present invention relates to a method and a system for creating and executing computer software applications utilizing multiple web browser components that access information stored on servers.

2. Description of the Related Technology

For many businesses, greater access to computers was realized with the introduction of personal computers (PCs) at affordable prices. Additionally, with the emergence of standardized software and graphical user interfaces, which made computers more user friendly, even small businesses were able to take over their own computer processing. "Multi-tasking" became a buzzword of the early 1990s as technology allowed multiple software applications to be executed simultaneously on a single operating system of the PC. Thus, for example, while business reports were processing, a user can answer e-mail or enter information into a database. Consequently, businesses became largely technologically self-sufficient.

Computing technology has revolutionized conventional businesses, but never more so than with the inception of the Internet. Commerce has drawn millions of people to the Internet. Tales of overnight success and self-made millionaires only add weight to the fact that the Internet can maximize a company's customer base with minimal cost. The Internet, through its well known World Wide Web (WWW or "the web") provides an extensive network of linked electronic pages, which usually are written in Hypertext Markup Language (HTML). A user wishing to access the web needs only a PC equipped with a modem and a software application known as a web browser (such as, for example, Microsoft Internet Explorer). A web browser is configured to establish a communications link via the Internet to other computers known as web servers, and to receive information from those servers. The information retrieved is then displayed to the user. Users have primarily accessed the Internet in order to find information (e.g., a child researches monkeys on a zoo's web site for a school report), communicate (e.g., letters are sent across the globe in minutes via electronic mail), or conduct business (e.g., virtually anything can be purchased or sold on the web).

However, Internet technology has remained rather linear in the way users access web pages. To illustrate, typically for a user to access a web page (i.e., an electronic page residing on the web), the web browser must draw the contents of the web page on the screen. The user then performs a task on that page, closes it, and then accesses the next web page, which the browser must draw to the screen. If information is incorrect or missing from a web page, the user must reload the web page, which then must be redrawn to the screen. This process of accessing and drawing web pages can be time consuming and, hence, impractical where a task to be accomplished requires accessing more than a few web pages.

Consider, for example, a payroll system. A typical payroll system would most likely contain the following elements: data entry (e.g., employees' personal information, or time that each employee has worked), performance of calculations to create payroll data, printing of payroll checks, printing of supporting reports, and providing accounting for taxing entities. Performing these tasks on the Internet is highly impractical due to the large amount of idle time spent accessing and drawing web pages. Thus, what is needed in the art is a system that provides faster access to a multiplicity of electronic pages stored in remote servers, such as those that make up the Internet.

SUMMARY OF THE INVENTION

One embodiment of the invention is a system for creating and running Internet-based computer applications work more efficiently by allows multiple browsers to be open and displaying multiple pages to a user at one time. Accordingly, embodiments of the present invention provide an application interface such that a user can access multiple web pages simultaneously, while appearing to work within a single application.

For example, in a payroll system such as described above, each of the electronic pages is made available concurrently, but within a single interface to the user. The user enters employee information, payroll information, perform calculations, print checks and reports, provides accounting to taxing entities-all within one integrated, wide-area-networked application, which here will be referred to as an "eApplication." The system and method disclosed here allows linear processing (moving from one step to the next) as well as parallel processing (one file may remain open at the same time that the user accesses another file).

SUMMARY OF THE INVENTION

Figure 1:
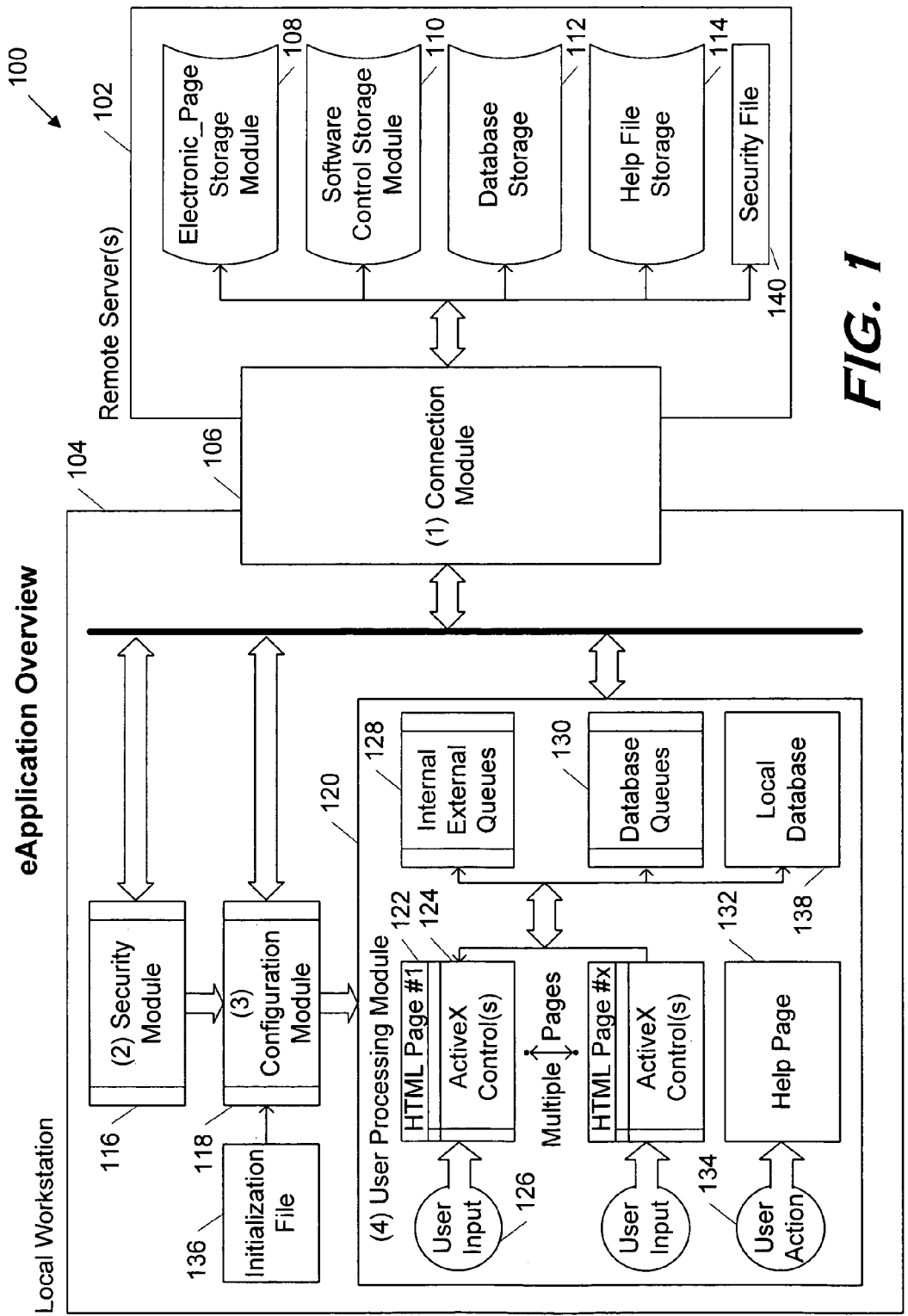
FIG. 1 is a state diagram showing a configuration of the components of one embodiment of the eApplication system.

One embodiment of the invention is a system for providing a distributed software application. This system includes: a server comprising a stored electronic main page, wherein the main page comprises at least two browser components for displaying additional electronic pages within the main page; a client computer comprising a browser program configured to establish a communication link with the server and display the stored electronic main page; and at least one software control on the main page for selecting one of the at least two browser components to display in the browser program.

Another embodiment of the invention is a method of processing information using a computer network, that includes: downloading an electronic main page from a server computer to a client computer, wherein the main page comprises at least two browser components for displaying additional electronic pages within the main page; providing at least one software control on the electronic main page; and displaying the stored electronic main page, wherein a first one of the browser components displays a first electronic page, and wherein activation of the software control results in as second one of the browser components displaying a second electronic page.

DETAILED DESCRIPTION OF THE PREFERRED EMBODIMENTS

The following description should not be taken in a limiting sense, but is made merely for the purpose of describing the general principles of the invention. The scope of the invention should be determined with reference to the claims.

Embodiments of the invention relate to software applications, referred to here as eApplications, that are executed on distributed computer systems. The eApplications run through conventional browser software, such as Microsoft Internet Explorer. Each eApplication includes multiple browser components that run seamlessly together to provide a rich, interactive and efficient means for communicating across a wide area network, such as the Internet. For example, an eApplication can include several separate browser components that run together in a window. Each browser component is a software module that communicates with a server computer separately to send, receive, and display data to the client computer. Because each browser component communicates with the server independently of the other components, multiple web pages are downloaded and displayed simultaneously in a client computer.

A "browser component" as used herein is a software module that provides an individual window for retrieving and displaying Internet pages. Of course, each page would not necessarily have to be obtained through the Internet. A browser component could retrieve pages from, for example, an Intranet server without departing from the scope of the invention. Examples of browser components can be found in the Internet Explorer Software Developer's Kit, obtainable from Microsoft Corporation.

One type of browser component is the Microsoft HTML parsing and rendering engine (MSHTML) from Microsoft Corporation. This component provides a window for displaying Hypertext Markup Language (HTML) pages, and also acts as a host for Microsoft ActiveX type controls. The MSHTML itself is an Active Document, so it can be hosted by implementing the Active Document interfaces in an application. By loading HTML pages into the MSHTML engine, the Microsoft Component Object Model (COM) can be used to access the underlying HTML text. In addition, COM objects hosted by MSHTML, such as ActiveX Controls, also have the ability to access the Dynamic HTML Object Model.

The eApplication described herein utilizes the "Microsoft Web Browser Control" to encapsulate each displayed HTML page. Each "Tab Control" has an associated Web Browser with the purpose of displaying information to the user for processing. A detailed description of the Web Browser and it's functionality is as follows.

The "WebBrowser" control adds browsing, document viewing, and data downloading capabilities to applications. Applications using this control will allow the user to browse sites on the Internet's World Wide Web, as well as folders in the local file system and on a network. The WebBrowser control supports Web browsing through point-and-click, hyperlink and URL navigation. The control maintains a history list that allows the user to browse forward and backward through previously browsed sites, folders, and documents.

The parsing and rendering of HTML documents in the WebBrowser control is handled by the MSHTML component of Microsoft® Internet Explorer 4.0 (and later versions). The MSHTML component is an Active Document (also known as a DocObject) that provides support for parsing and rendering HTML, exposes the Dynamic HTML (DHTML) Object Model, and hosts Microsoft® ActiveX® Controls and script languages. The WebBrowser control acts as a container for the MSHTML component and implements navigation, hyperlink, history lists, favorites, and security. Applications can also use the WebBrowser control to host Active Documents other than MSHTML. This means that richly formatted documents, such as Microsoft® Excel spreadsheets or Microsoft® Word documents, can be opened and edited in place from within the WebBrowser control.

MSHTML can load pages from URLs or from files. A host can load and display the page at a specific URL by constructing a URL moniker and then calling the MSHTML implementation of load. The MSHTML implementation is specifically designed to support the loading of data asynchronously over slow links. When a page is loaded, MSHTML assists in resolving the specified URLs. If desired, a host can implement a version of this method to provide additional control. This method is not called when downloading items within the page, such as images. MSHTML can also load and save HTML through its implementation of the file interfaces which operate asynchronously. Because MSHTML loads documents asynchronously, it might not be possible to gain immediate access to the object model of the requested document. To determine when the requested document has completely loaded, a hosting application typically implements the "on change" method which uses the standard connection point protocol to advise MSHTML of the availability of this outgoing interface.

MSHTML is responsible for loading and running scripts that appear within HTML. Because scripting uses the ActiveX Scripting interfaces, any ActiveX script engine can be hosted by MSHTML.

Because MSHTML is an Active Document, it communicates with its host using the target interface. With this interface, the following details are communicated to the hosting frame:

Menu/Toolbar enabling-The common menus and toolbar buttons found on the host (Cut, Copy, Paste, and so on) are enabled and disabled by sending MSHTML commands and queries.

MSHTML commands-Common functions, such as Refresh, Stop, and Hide Toolbars, are sent by the host to MSHTML through commands.

Status bar updates-Progress and status bar text information is communicated to the hosting frame by MSHTML through commands.

In addition to the standard command group, MSHTML supports a group of MSHTML-specific commands that provide simple access to a number of MSHTML-specific features.

MSHTML Terminology

Active Document—Also known as an OLE Document Object or Doc Object. An Active Document is a contained object; the container provides the frame and some basic user interface (UI). In such containers, the Active Document can be interchanged with other Active Documents while the containing frame and its UI remain constant. Examples of Active Document containers include the Office Binder and Internet Explorer 3.0, where the Active Document could change to Microsoft® Word or Microsoft® Excel while maintaining the same outer frame application. An Active Document is similar to an OLE Embedding scenario or an ActiveX control, but its interfaces are designed to support an object that is at the top level and takes up the entire content area of the frame. There are specific interfaces required to support Active Document functionality.

ActiveX control—Also known as an OLE Control. An ActiveX control is a contained mini-application. It can (optionally) maintain state, draw itself, persist itself, have its own window, respond to automation methods, throw events, take keyboard focus, respond to mouse and keyboard input, and show merged menu and toolbar UI. Support was added to Internet Explorer 4.0 to take advantage of new interfaces that improve the performance of ActiveX Controls and make them suitable for the Internet.

ActiveX Scripting—A standard set of interfaces that allows for language-independent script integration to applications. Any scripting engine—such as Microsoft® Visual Basic® Scripting Edition (VBScript), Microsoft® JScript®, or a third-party scripting language, for example—that supports the standard interfaces can be integrated with an ActiveX scripting host such as MSHTML.

Aggregation—A kind of run-time inheritance. By aggregating, an object can extend and enhance the functionality of another object but still take advantage of the functionality and interfaces of the aggregated object. Objects can be designed to be aggregated or not. MSHTML is designed to be aggregated.

Ambient—A property owned by the container and supplied to an ActiveX object through the dispatch interface on its hosting site.

Automation—A set of standards to allow an object to be programmed by scripts. Every object that can be automated can have methods and properties that can be used by a script, as well as events that can trigger scripts to be run.

Command—A simple action sent to an ActiveX object through the command interface. Commands usually correspond to user-level commands, such as the commands on menus, and can be enabled or disabled by the command target. A command can be sent to the frame, the container site, MSHTML, or a control.

Container—The ActiveX object that owns the site obtained through the container. From the container, the contained objects can be enumerated. This concept of containment should not be confused with the concept of containment used for scripting and supplied by automation interfaces. Some contained automation objects are not contained ActiveX objects, and some contained ActiveX objects cannot be automated.

Dispatch Interface—An interface inheriting from dispatch that is used to access named automation properties and methods of an object from a script.

Document Window—The document window, with toolbar space, supplied to an ActiveX object through context interface (In the multiple document interface [MDI] it is the document window, and in the single document interface [SDI] it is NULL.) MSHTML currently ignores the document window.

Event Interface—A callback interface attached to an object using the container. This is used by script engines to get notification of events thrown by objects.

MSHTML—An Active Document that is capable of rendering HTML and laying out contained ActiveX Controls. In this document, it refers to an instance of the MSHTML COM object that implements events and methods, and many other interfaces.

Service—Functionality supplied by the host to an ActiveX object through the service provider interface on the container site. Each service is identified by a service identifier (SID), allowing access to interfaces and methods.

Site—The object supplied by a container to a contained object through the site object. Containers of an ActiveX object must supply a site before doing anything else. MSHTML gets much of its information about its geometry, activation, and ambient properties from its container site. MSHTML supplies a site for each ActiveX control it hosts.

X Object—An object that MSHTML wraps around each hosted control to supply common, per-control, container-owned properties and events. MSHTML aggregates the X object to the control, if possible, and merges types with the control.

The eApplication

An eApplication system typically includes two software modules. One module, the eApplication Initialization module, enables a software developer, for example, to design and record the components used to build a particular eApplication. Using this module, the software developer produces an initialization file. The second software module, a Browser Program, uses the initialization file to construct a specific eApplication (e.g., a Payroll System). The Browser Program typically includes multiple browser components that display and manage a plurality of electronic pages (e.g., web pages) having embedded functionality, such as ActiveX controls. The embedded functionality within each electronic page allows a user to enter data onto the page, or issue commands for accomplishing a specific task over a computer network having a client-server architecture. In one embodiment, the eApplication is a thin client and, therefore, only stores the client side components that are small in nature.

As stated above, a software developer uses the eApplication system to create application programs that use multiple web browser components. In one embodiment, the eApplication includes multiple browser components that presented in a unified graphical user interface that utilizes a tabbing system. In the tabbing system, a tab is associated with each browser component, and each tab is labeled as to the purpose of the web page displayed within the browser component. Each web page that is displayed provides the specific software modules and programs necessary to perform a given task (e.g., add a new employer to the payroll for a business).

The Browser Program, thus, enables a user to select a specific operation, such as entering the personal information of a new employee, by selecting the corresponding tab. The user may then provide the relevant input and submit the results to the server by selecting a button on the displayed page. Since all the necessary web pages are downloaded to the client computer and each page is controlled by separate browser components at one time, the eApplication significantly reduces the time for web page acquisition and redraw. In addition to displaying the multiple web pages to the client, the Browser Program also coordinates the functionality of the different components that it comprises.

For example, one browser component might display a page for adding a new employee. As the user enters the new employee information, a set of variables is stored to the user's computer. These variables are retrieved by pages running within other browser components so that each page is instructed that a new employee has been added to the system. Thus, actions taken within one browser component can be programmed to affect the actions and displays in other browser components. In addition, because these variables are temporarily stored on the user's local computer, they will remain persistent even if the power is interrupted, or the user inadvertently closes the eApplication program without updating the server with new data.

In the following discussion, a system and method of creating and executing an eApplication over a computer network is described at first in a generalized embodiment. The description later discusses an exemplary eApplication payroll program that has been developed using the methods described herein.

FIG. 1 is a state diagram showing a configuration of the components of one embodiment of an eApplication system 100. The eApplication system includes a local workstation 104 configured to communicate with a remote server 102 via a connection module 106. The remote server 102 is typically a processor-based computing device, such as a conventional server computer, having the capacity to store electronic data. The remote server 102 provides storage for an electronic-page module 108, a software controls module 110, a database module 112, a help file module 114, and a security module 140.

The electronic-page module 108 comprises a plurality of electronic pages having, for example, hypertext mark-up language (HTML). As is well-known in the relevant technology, an electronic page may be a web page, which is a document residing on a server computer and having a unique address or URL (Uniform Resource Locator). The software controls module 110 contains a series of software controls such as, for example, push-buttons, scroll bars, radio buttons, and pull down menus. In one embodiment, the software controls are ActiveX controls. However, for the purposes of the e-Application system 100, it will be apparent to a person of ordinary skill in the relevant technology that the functionality provided by ActiveX controls may be alternatively provided by software controls based on other technologies.

The database storage module 112 contains information related to a specific eApplication. Thus, in a payroll system application, for example, the database storage module 112 would store employee, salary, taxing authorities, human resources, and accounting information. This type of storage and the method of accessing the database storage module 112 are well-known in the relevant technology. Typically, for example, a developer uses databases purchased from Microsoft Corporation (Redmond, Wash.), Oracle Corporation (Redwood Shores, Calif.), or any other client/server relational database management system.

The help file module 114 stores the help files that are attached to a specific eApplication. The help files provide users with assistance in learning to use the eApplication, specific information on each facet of the eApplication, and methods to troubleshoot normal application problems that may arise. These files may be video, audio presentations, documents, or any other media that may be used to convey to the user information to assist in the use of the eApplication.

The security file 140 contains information to initialize the status of the eApplication. The security file 140 preferably contains at least a current status flag indicative of the user's ability to access the eApplication. The return flag from the file is either "Active" or "Inactive." When a user attempts to access the eApplication by pointing their browser software to a URL that hosts an eApplication, the connection module 106 check the status of the eApplication by opening the security file. If the status is marked as Active, the initialization process continues. However, if the status of the eApplication is marked as Inactive, the connection module 106 causes the eApplication to stop loading and terminates execution. The security file 140 may also contain additional information required to authenticate components of the eApplication and insure proper execution.

The connection module 106 typically includes software modules having instructions for establishing a connection, via a computer network (not shown), between the remote server 102 and the local workstation 104. Computer networks suitable for use with the eApplication system 100 include local area networks (LAN), wide area networks (WAN), or other connection services and network variations such as the World Wide Web, a public network (e.g., the Internet), a private Internet, a private computer network or intranet, a secure Internet, a value-added network, and the like. The computer network may include one or more LANs, WANs, Internets, and computers. The networked computers may be servers, clients, or a combination thereof. The connection module 106 may include, for example, a software module that obtains universal resource locator (URL) information associated with the remote server 102.

The local workstation 104 is any processor-based computing device such as, for example, a personal computer capable of accessing a computer network. Other such devices may be workstations, servers, minicomputers, mainframe computers, laptop computers, mobile computers, palmtop computers, hand held computers, set top boxes for a TV, or a combination thereof. The workstation may further possess input devices such as a keyboard or a mouse, and output devices such as a computer screen or a speaker.

The local workstation 104 also hosts a security module 116 in communication with both the connection module 106 and a configuration module 118. The configuration module 118 also communicates with the connection module 106, as well as with a user processing module 120.

The security module 116 includes a plurality of software modules which include instructions for determining, for example, whether to grant any given user access to the eApplication system 100. The configuration module 118 may include a plurality of software modules for initializing and setting different features of the eApplication system 100. For example, the configuration module 118 may include a software module for registering software controls to be used in any given eApplication. Initialization file 136 serves as input to the configuration module 118. An initialization file 136 will be further described below in connection with FIG. 16.

The user processing module 120 is linked to the configuration module 118 and the connection module 106. During execution of an eApplication, the user processing module 120 hosts a plurality of electronic pages 122, which correspond to electronic pages stored in the electronic pages module 108. The electronic pages 122 contain, and interact with, software controls 124, which themselves correspond to software controls found in the software controls module 110 or in the operating system of the local workstation 104. The electronic pages 122 and the software controls 124 communicate with a database queues module 130 and an internal/external queues module 128. The database queues module 130 includes software modules for controlling access to the database module 112 stored in the remote server 102, as well as a database 138 hosted in the local workstation 104. Additionally, database requests can be stored within the user processing module 120 to reduce network requests, thereby making the eApplication more efficient.

The internal/external message queues module 128 coordinate communication between, and among, the electronic pages 122 and the software controls 124. For example a software control 124 may put into the internal message queue 128 data to be delivered to another component, such another software control 124. Typically each software control 124 has a timer to read the internal/external message queues 128. Additionally, internal message queues access and execute visual basic for eApplication scripts. The internal/external message queues module 128 also coordinates communication between the user processing module 120 and the modules hosted in the remote server 102. Finally, the user processing module includes a help page module 132, which may contain software modules that aid the user, upon user action 134, to understand how to utilize the user processing module 120.

Figure 2:
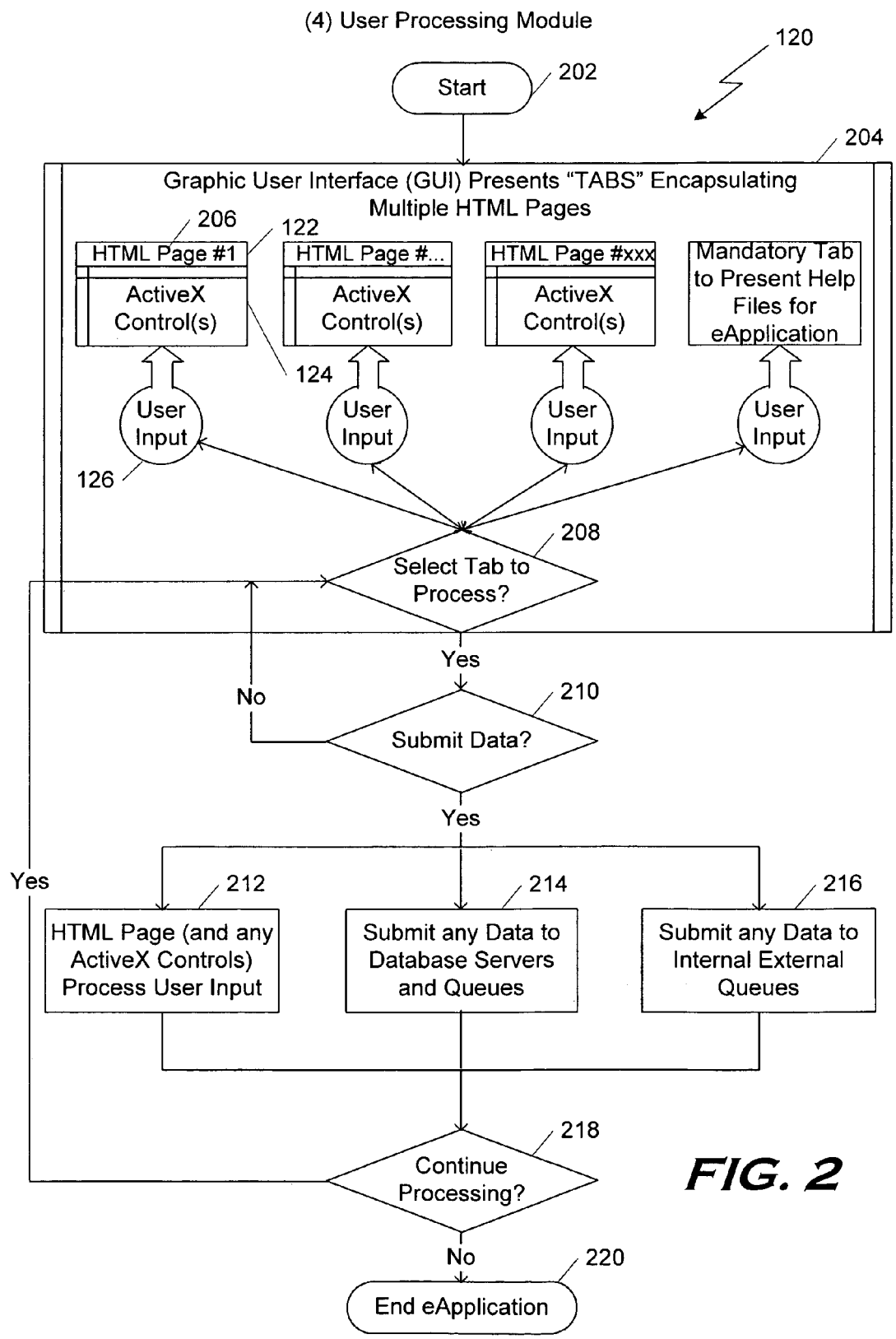
FIG. 2 is a process diagram illustrating the operation of one embodiment of the user processing module shown in FIG. 1.

Having described an eApplication system 100 generally, the following discussion will now describe its separate components and associated functions in greater detail. FIG. 2 is a process diagram illustrating the operation of one embodiment of the user processing module 120. The user processing module 120 provides both a user interface that facilitates user input 126 and the functionality required to process and store the user input 126. The process begins at state 202. In one embodiment, at state 204 a window presents to the user a plurality of tabs 206, any one of which the user may select at decision state 208 in order to perform a task.

Having selected a tab 206, the user is then presented with the electronic page 122 and the software controls 124 associated with the selected tab 206. The tab 206 is said to "encapsulate" its associated electronic page 122 and software controls 124. The electronic page 122 and associated controls 124 provide information to the user, and provide functionality to allow the user to enter relevant data, i.e., user input 126, for processing and storage. At decision state 210, the user may choose to submit the user input 126 for processing. The user, however, may choose not to submit the user input 126 and, instead, choose to work on another task by selecting a different tab 206. If the user chooses to submit the user input 126 for processing, the electronic page 122 and associated controls 124 process the user input 126 at state 212. However, the user input 208 may be communicated to the database queues 130 and the database module 112, or the user input may be transferred to the internal/external queues 128, or any combination thereof. At decision state 218, the user may choose to continue performing tasks, by selecting another tab 206 or by revising the user input 126 in the current tab 206, or the user may elect to end the e-Application session by moving to state 220.

Figure 3:
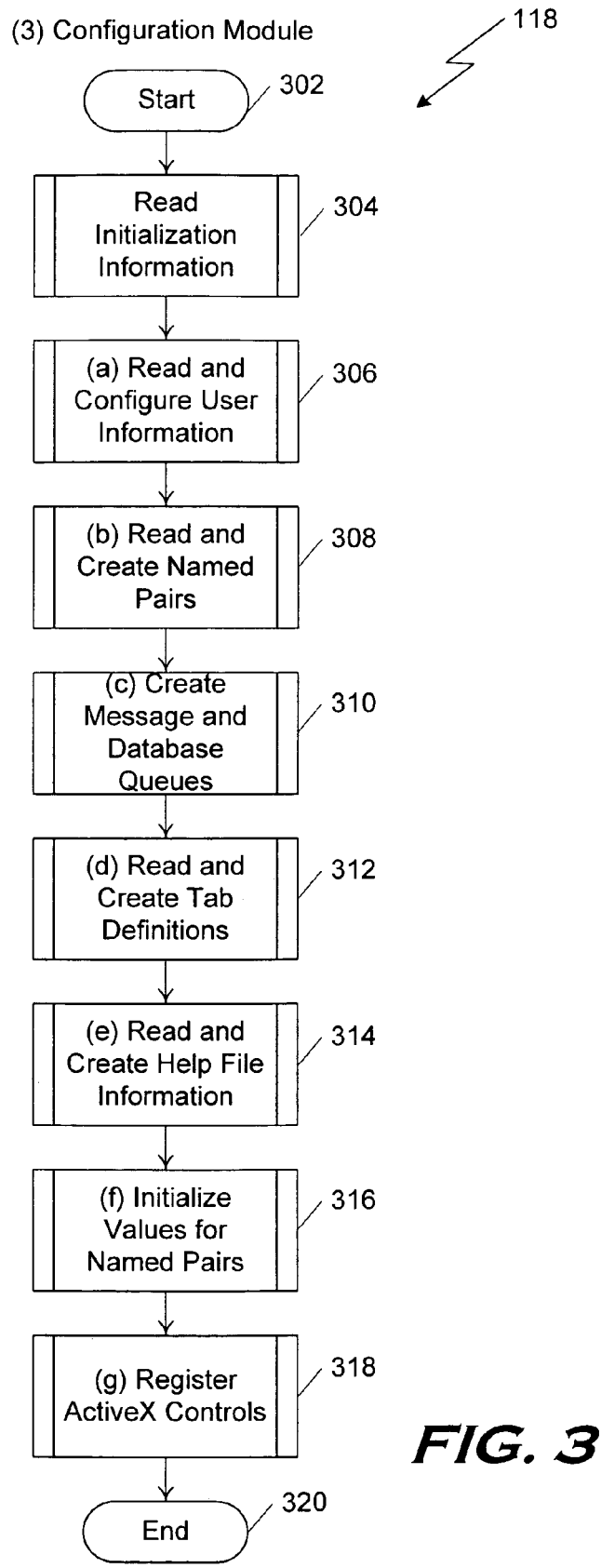
FIG. 3 is a flowchart depicting at a general level the process executed by the configuration module shown in FIG. 1.

Using as input the initialization file 136, the configuration module 118 constructs the user processing module 120 described above. FIG. 3 is a flowchart depicting at a general level the process executed by the configuration module 118. The configuration process starts at state 302. At state 304, the configuration module 118 reads the initialization file 136 stored in the local workstation 104. The process then proceeds to state 306, where the configuration module 118 reads and configures user information (this subprocess is further detailed in FIG. 4). At state 308, the configuration module 118 reads and creates named pairs (this subprocess is further detailed in FIG. 5). The configuration module 118 then creates message and database queues at state 310 (this subprocess is further detailed in FIG. 6).

Figure 7:
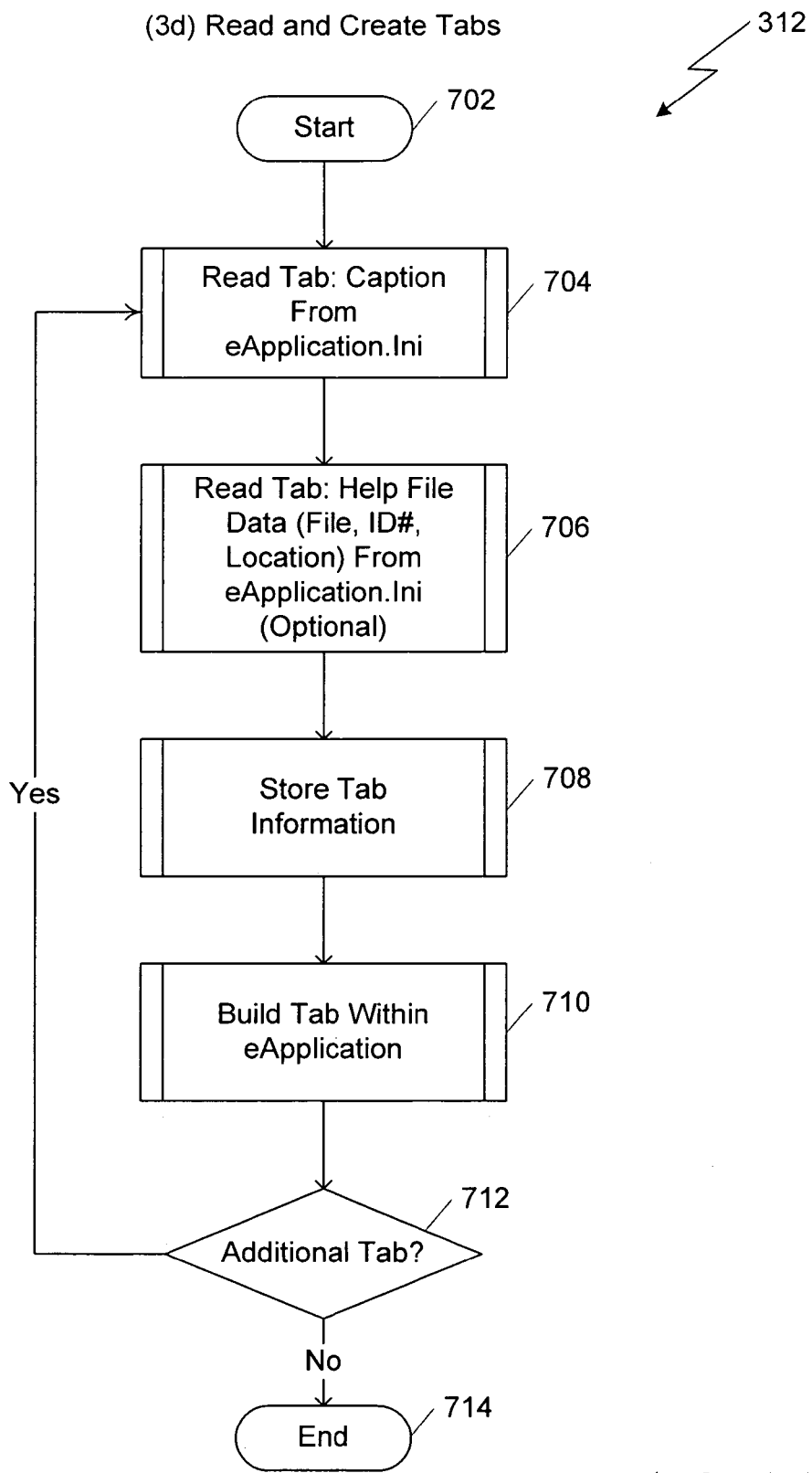
FIG. 7 is a flowchart illustrating in further detail the process of reading and creating tab definitions shown in FIG. 3.

At state 312, the configuration module 118 reads and creates tab definitions (this subprocess is further detailed in FIG. 7). The process then proceeds to state 314, where the configuration module 118 reads and creates the Help file information (this subprocess is further detailed in FIG. 8). At state 316, the configuration module 118 initializes the values for the named pairs (this subprocess is further detailed in FIG. 9) created at state 308. The process then proceeds to state 318, where the configuration module 118 registers the software controls 124 (this subprocess is further detailed in FIG. 10). Finally, the configuration module 118 terminates at end state 320.

Those of ordinary skill in the relevant technology will recognize that in configuring the eApplication the sequence of states described above is only exemplary and not exclusive of other functionally equivalent sequences. For example, state 306 may be followed by state 316 instead of state 308. That is, after having read and created the named pairs (state 308), the configuration file may then initialize the values for the name pairs (state 316), rather than proceeding to create message and database queues (state 310).

Figure 4:
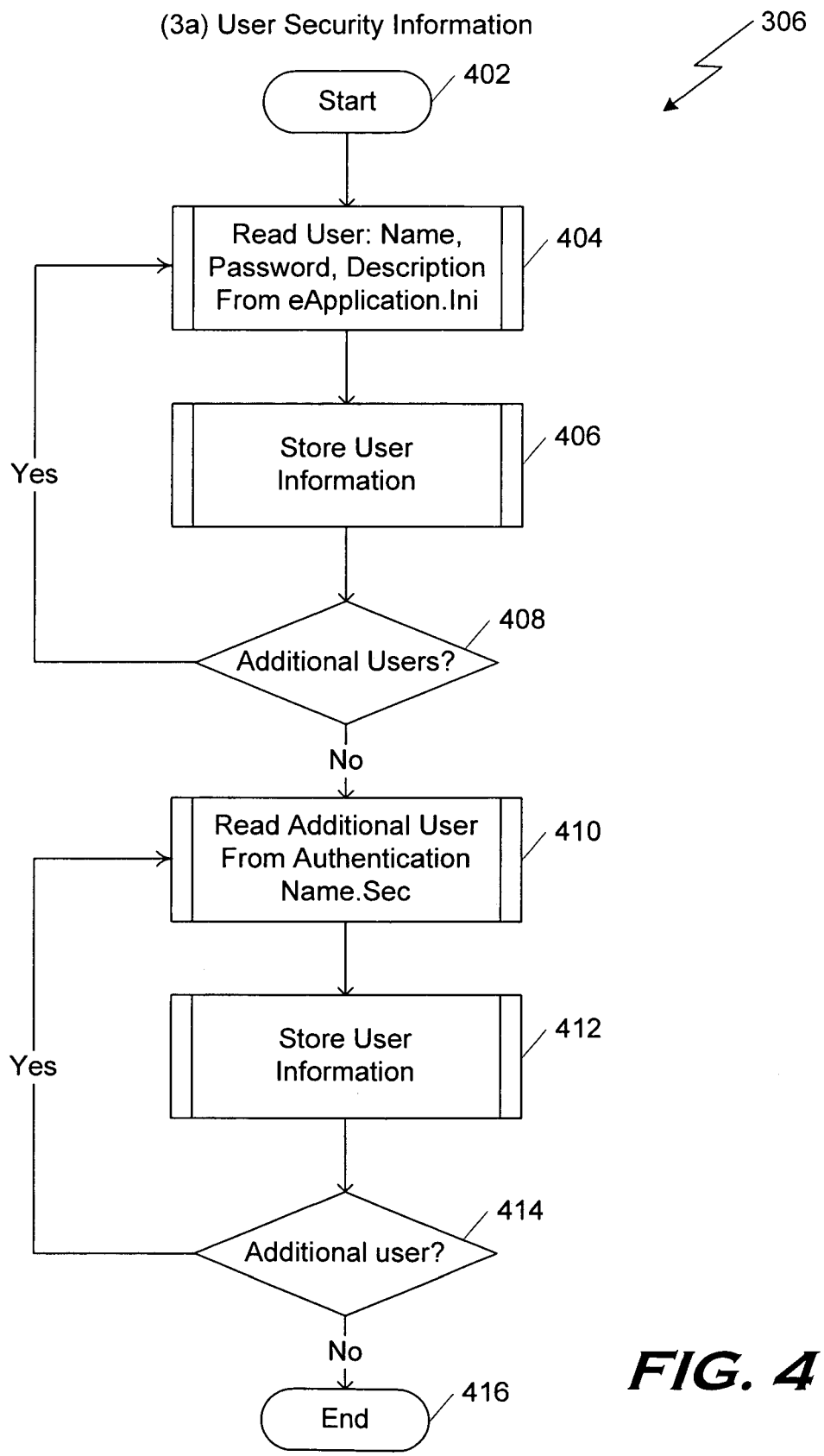
FIG. 4 is a flowchart illustrating in further detail the process of reading and configuring user information shown in FIG. 3.

FIG. 4 is a flowchart illustrating in further detail the process of reading and configuring user information (state 306). The process begins at state 402, after the configuration module 118 has read the initialization file 136 at state 304. At state 404, the configuration module 118 reads the user name, description, and password from the initialization file 136. The process then moves to state 406, where the configuration module 118 stores the user information in the memory of workstation 104. At decision state 408, the configuration module 118 determines whether additional user data needs to be read from the initialization file 136. If that is the case, the process returns to state 404; otherwise, the process moves to state 410, where the configuration module 118 reads an additional user from the security file 140 located on the remote server 102.

This feature allows an administrator on the server side of the system 100 to add users without having to modify the initialization file 136. At state 412, the configuration module 118 stores the user information to the memory of workstation 104. The configuration module 118 then determines whether there is an additional user to be read from the security file 140. If that is the case the process returns to state 410; otherwise, the process ends at state 416.

Figure 5:
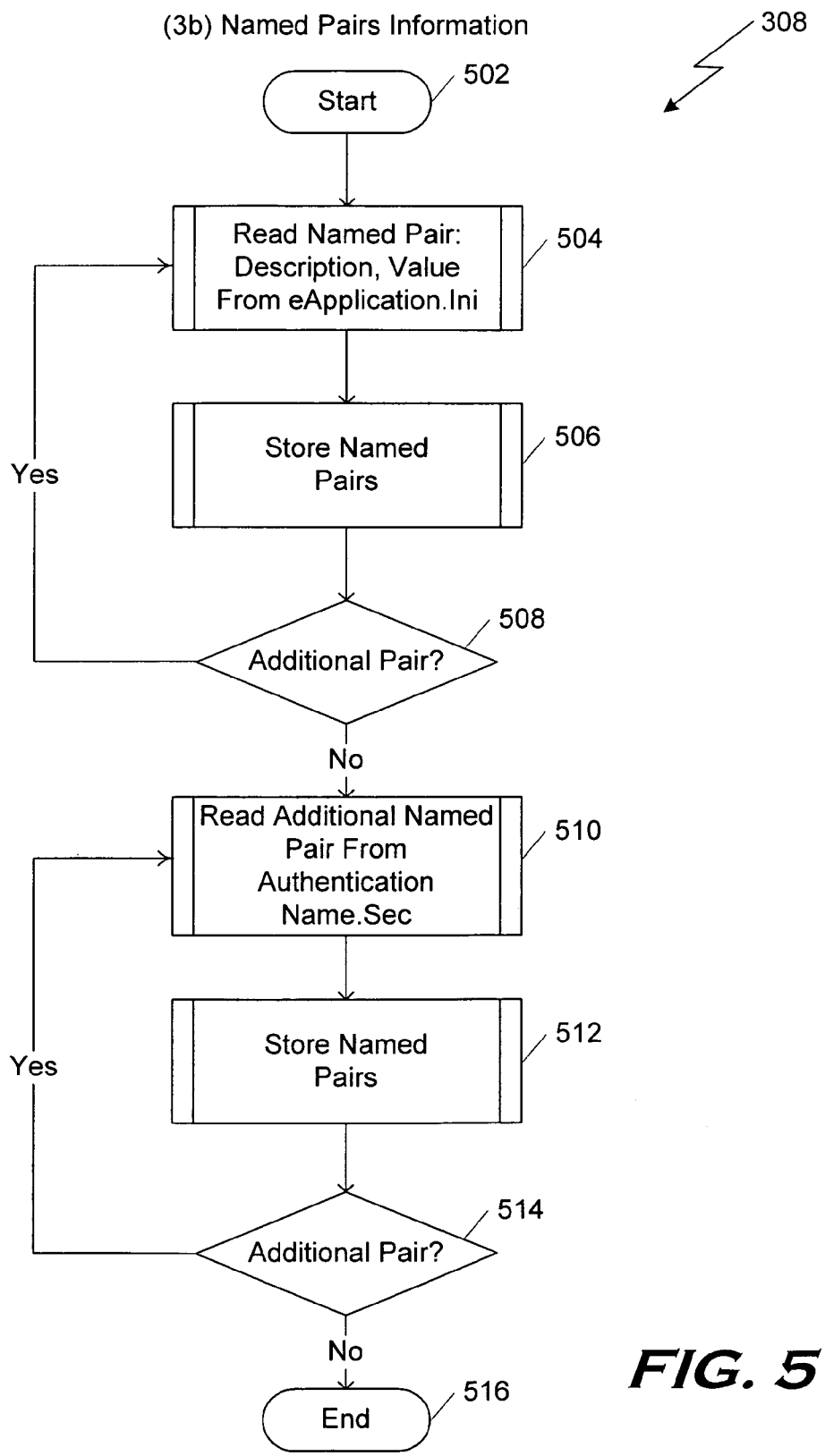
FIG. 5 is a flowchart illustrating in further detail the process of reading and creating the named pairs shown in FIG. 3.

FIG. 5 is a flowchart illustrating in further detail the process of reading and creating named pairs (state 308). A named pair consists of a parameter descriptor and its value, i.e., {Parameter Name}=value. For example, the named pair "eApplication Title=Payroll System" consists of the descriptor "eApplication Title" and its value "Payroll System." Named pairs are used to initialize the eApplication's fixed values, as well as to pass information to other components of the system. Named pairs act as the properties of the eApplication and are exposed to other elements within the same process by utilizing "variable=GetParameter (Parameter Descriptor)" and "LetParameter (Parameter Descriptor) =variable".

Also, named pairs may be communicated between the eApplication and software controls 124 using a Get ParamValue and Put ParamValue instruction. Named pairs may be used to communicate with the remote server 102 at application, session, and user levels. The process begins at state 502, after the configuration module 118 has read and configured the user information (state 306). At state 504, the configuration module 118 reads from the initialization file 136 the description and value of each named pair. The configuration module 118, at state 506, then stores the named pairs in the memory of workstation 104. At decision state 508, the configuration module 118 determines whether there are any additional pairs to be read from the initialization file 136. If that is the case the process returns to state 504; otherwise the process moves to state 510, where the configuration module 118 reads additional pairs from the security file 140.

This feature allows addition of named pairs by an administrator on the server side of the system 100 without having to modify the initialization file 136. At state 512, the configuration module 118 stores the named pairs in the memory of workstation 104. At decision state 514, the configuration module 118 determines whether there are any additional pairs to be read from the security file 140. If that is the case, the process returns to pair 510; otherwise, the process ends at state 516.

Figure 6:
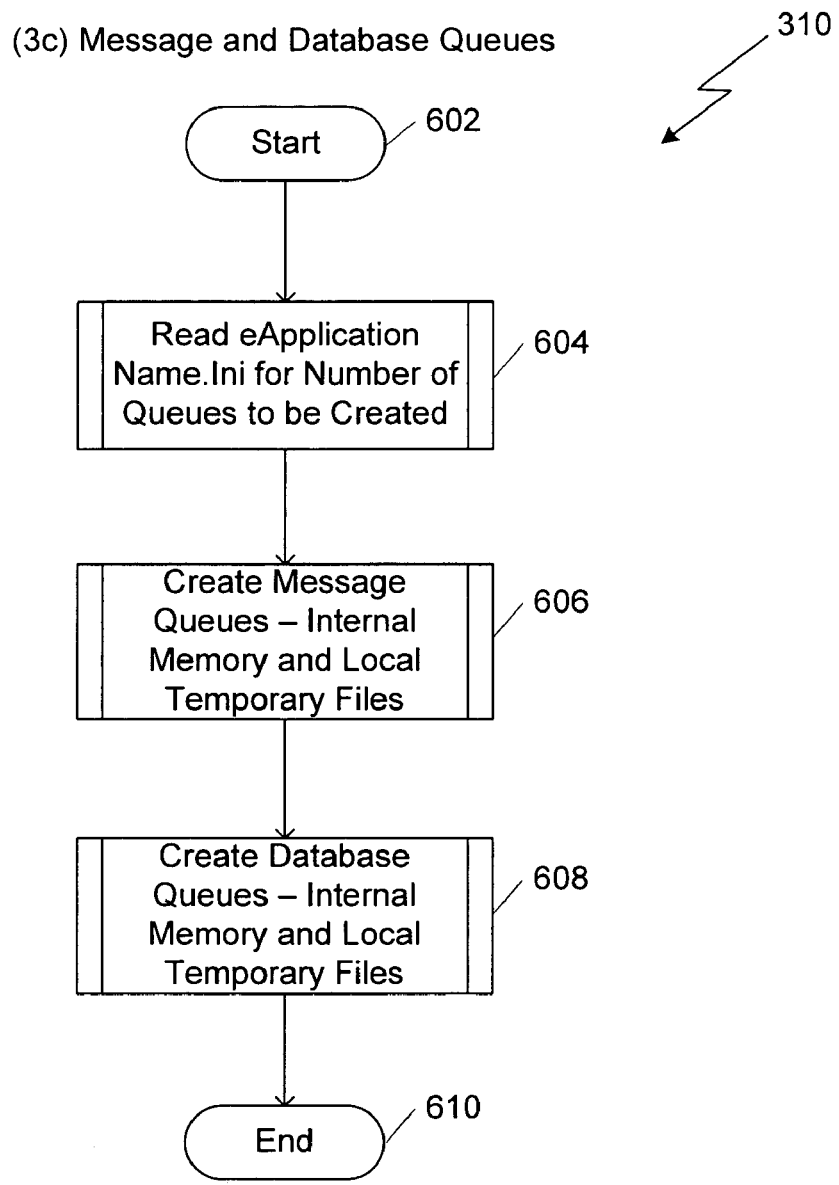
FIG. 6 is a flowchart illustrating in further detail the process of creating internal/external message and database queues shown in FIG. 3.

FIG. 6 is a flowchart illustrating in further detail the process of creating internal/external message and database queues (state 310). As previously stated, software controls 124, electronic pages 122, and the eApplication communicate with each other utilizing an internal/external message queue 128. Messages are posted for a specific object and retrieved by an object from these internal queues. A software control 124 put data into the queue that is to be delivered to another component (e.g., another control 124 or electronic page 122). Each software control 124 then preferably has a timer that initiates a read of the message queue 128.

Internal queues are used to access and execute eApplication scripts, such as from Visual Basic, provided by the developer as external script files or executable programs. The process starts at state 602, after the configuration module 118 has read and created the named pairs at state 308. At state 604, the configuration module 118 reads the initialization file 136 to determine the number of queues to be created. The process then moves to state 606, where the configuration module 118 creates message queues 128, as well as internal memory and local temporary files. At state 608, the configuration module 118 creates the database queues 130, as well as related internal memory and local temporary files. Queues are stored in the memory of workstation 104. A control 124 informs other components of a specific event by writing to the queue a coded instruction that is specific to another component. Each component reads the queue and executes the necessary steps that are specific to its design.

The eApplication delivers queue instructions from one queue to another by continuously monitoring queues 128 and physically transferring coded instructions. The eApplication can also receive coded instructions and execute any internal routines that may be required. This feature allows for database requests to be stored on a local computer and, hence, reduce network requests. An error condition can, for example, store database requests in a temporary file on the user's workstation 104 for error recovery. An internal database storage allows software controls 124 to read, within the eApplication, information from the local database 138 or the database module 112 residing in the server 102. Having created the database queues at state 608, the process 310 ends at state 610.

FIG. 7 is a flowchart illustrating in further detail the process of reading and creating tab definitions (state 312) for an eApplication. The process starts at state 702, after the configuration module 118 has created the message queues 128 and database queues 130 at state 310. At state 704, the configuration module 118 reads from the initialization file 136 the caption for a tab 206 to be created. The process then moves to state 706, where optionally the Help File data associated with the tab 206 is read. The information read may comprise the Help File's name, identification number, and location. At state 708 the configuration module 118 stores the tab 206 information in the memory of workstation 104. The configuration module 118, at state 710, then builds the tab 206 within the eApplication. A tab 206 is created within the tab control with the appropriate caption, help file attachment and help file context ID (help file information is optional).

A web browser object is then created and linked with the tab 206 such that when a user selects a tab 206, a specific web browser component will be displayed. As can be imagined, the web browser object can contain a series of browser components, wherein each component provides a window that displays a page. By selecting one of the tabs, the browser component (eg: window) that is linked to the selected tab is moved to the front position on the desktop. This makes the page that is displayed within that browser component appear to the user, while the pages simultaneously displayed within the other browser components are hidden.

At decision state 712 the configuration module 118 determines whether there are any additional tabs 206 to be read and created. If so, the process returns to state 704; otherwise the process ends at state 714.

Figure 8:
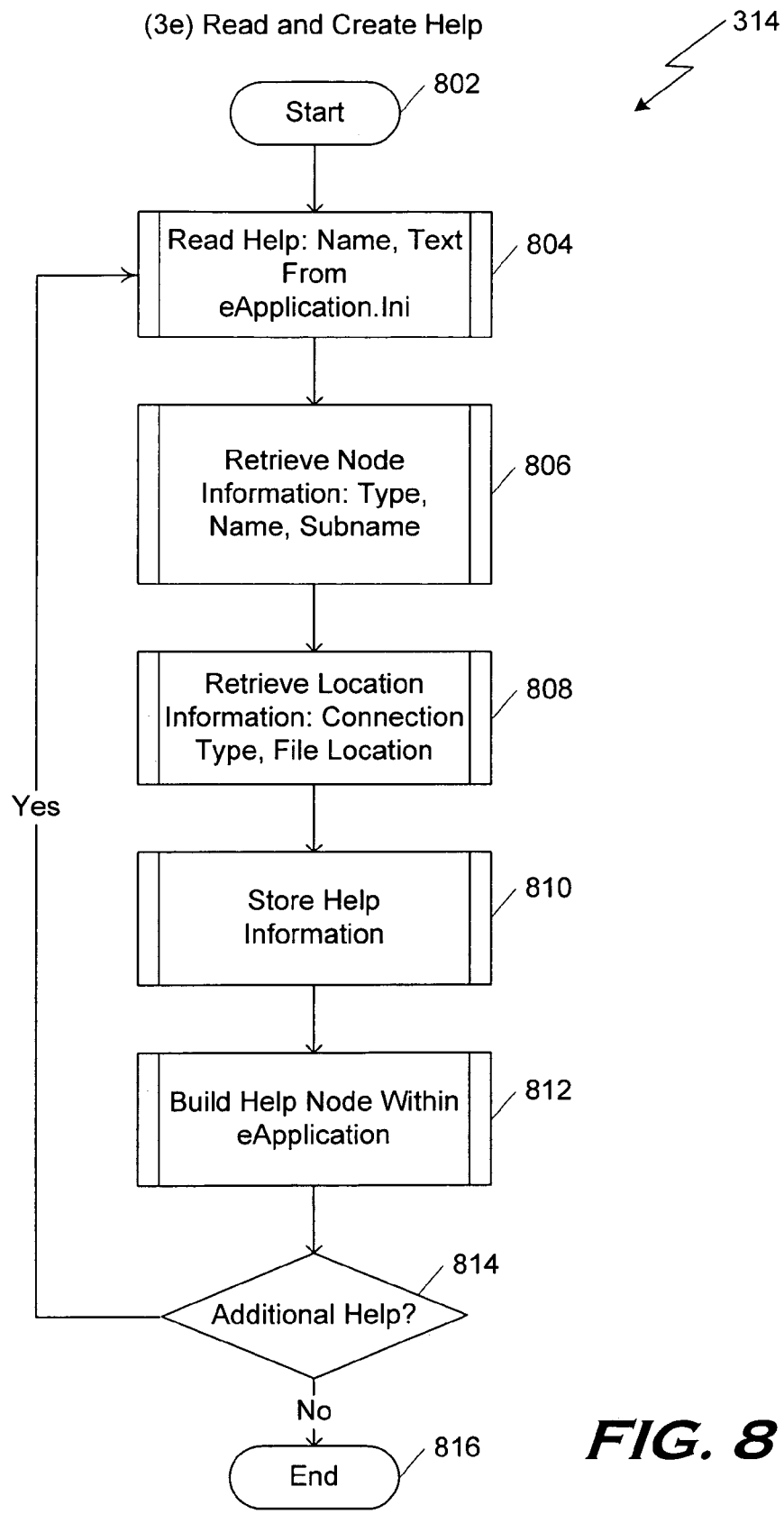
FIG. 8 is a flowchart illustrating in further detail the process of creating the Help File shown in FIG. 3.

FIG. 8 is a flowchart illustrating in further detail the process of creating the Help File (state 314). The process starts at state 802, after the configuration module 118 has read and created the tab definitions at state 312. At state 804, the configuration module 118 reads from the initialization file 136 the name and text of the Help File. The process then moves to state 806, where the configuration module 118 retrieves the type, name, and subname of each node. At state 808, the configuration module 118 retrieves the location information, which may include a connection type and a file location of the help files. The help files may be located in the same location as the eApplication, or on a server located on the Internet at a specific URL, or on the local hard drive of the workstation 104.

This allows design flexibility allows choices of the most efficient method of delivering help content. The configuration module 118 then, at state 810, stores the Help File information in the memory of workstation 104. The process then proceeds to state 812 wherein the configuration module 118 builds a help node within the eApplication. Help file information is stored in the help page module 132 as illustrated in FIG. 1.

In one embodiment, the help page module 132 may be information stored in "Tree List" control. Tree lists are hierarchical outlines that start with a "Main" node that is the topmost classification. Each main node contains "Parent" nodes that further subdivide the main node into additional classifications. Each parent node contains one or more "Child" nodes that are the specific information to access a help delivery product. The configuration module 118 builds each of these nodes as defined in the initialization file 136. At decision state 814, the configuration module 118 determines whether there is an additional Help File to be created. If that is the case, the process returns to state 804; otherwise, the process ends at state 816.

Figure 9:
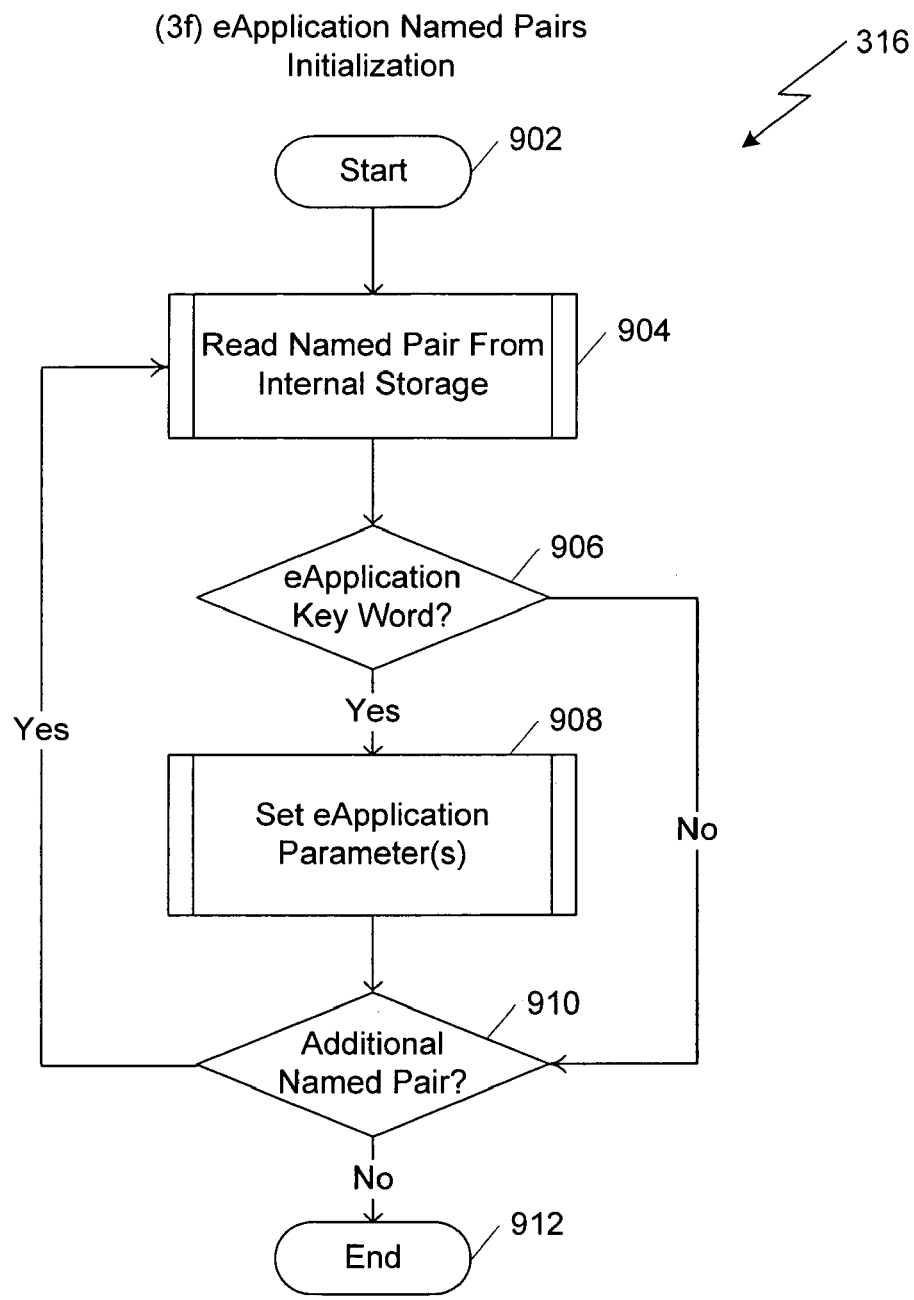
FIG. 9 is a flowchart illustrating in further detail the process of initializing the values for the named pairs shown in FIG. 3.

FIG. 9 is a flowchart illustrating in further detail the process of initializing the values for the named pairs (state 316). The process starts at state 902, after the configuration module 118 has created the Help File at state 314. At state 904, the configuration module 118 reads the named pairs from the memory of local workstation 104. The process then moves to decision state 906, where the configuration module 118 determines whether the named pair is an eApplication keyword. Keywords are used within the system to pass information externally to the eApplication. For example, a keyword may be a background color of the eApplication text display box, or the splash screen title. This feature allows an application developer, for example, to create specific eApplications that are tailored to any given user group.

If at decision state 906 it is determined that the named pair is an eApplication keyword, the configuration module 118 sets the eApplication's internal memory value of the parameter at state 908. For example, Backcolor=value, SplashTitle=Value, etc. The process then proceeds to decision state 910, which is also the state where the process continues if at decision state 906 it is determined that the named pair is not an eApplication keyword. At decision state 910, the configuration module 118 determines whether there are additional named pairs to be initialized. If additional named pairs need to be initialized, the process returns to state 904; otherwise, the process ends at state 912.

Figure 10:
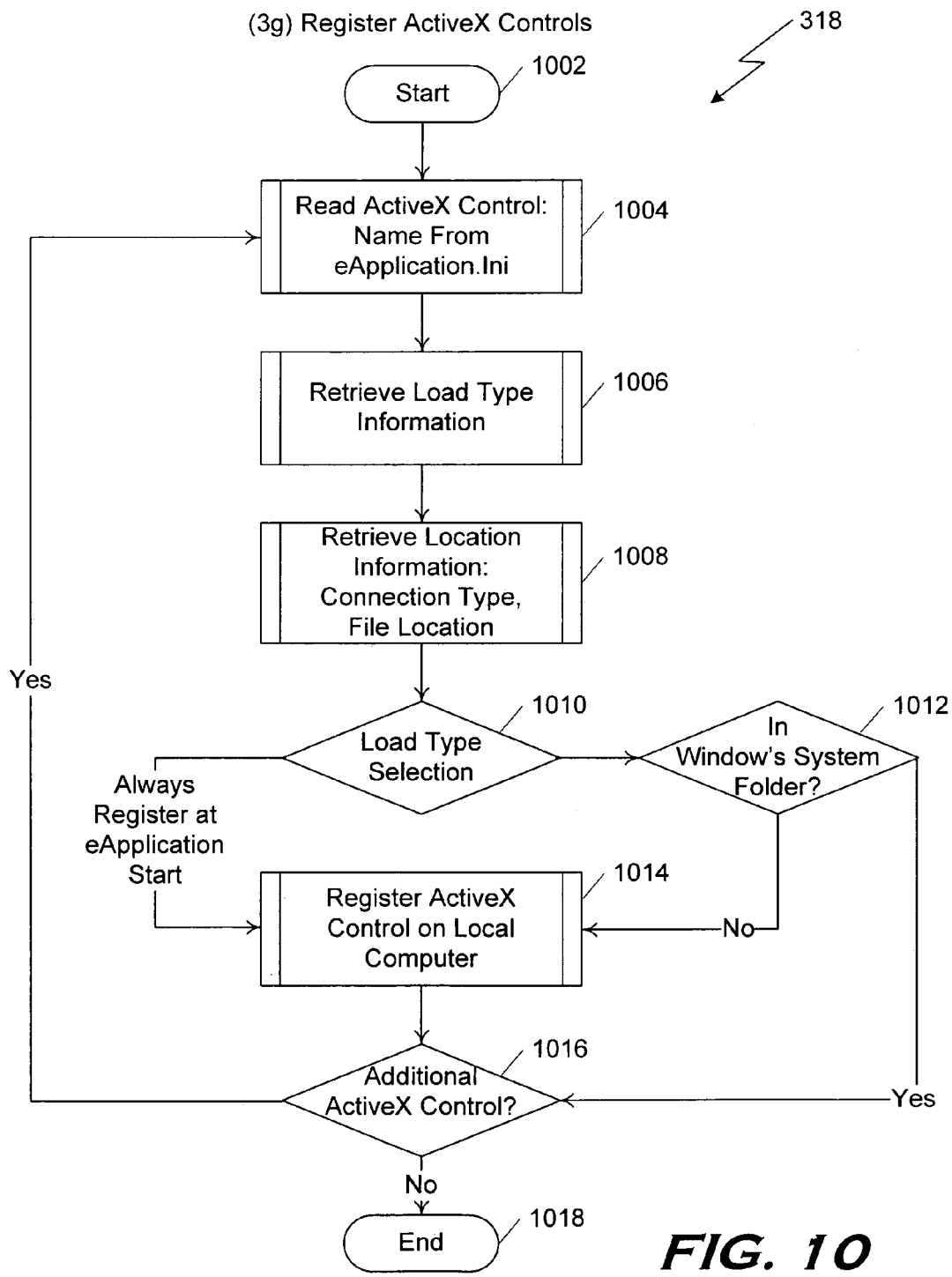
FIG. 10 is a flowchart illustrating in further detail the process of registering the software controls shown in FIG. 3.

FIG. 10 is a flowchart illustrating in further detail the process of registering the software controls 124 (state 318). The process starts at state 1002, after the configuration module 118 has initialized the values for the named pairs at state 316. At state 1004, the configuration module 118 reads from the initialization file 136 the name of the software control 124. The process then moves to state 1006, where the configuration module 118 retrieves the "load type" information of the software control 124. A load type may be, for example, "Load/Unload Application start/End" or "Load Only If ActiveX Does not exist". The first load type retrieves the control 124 from the storage location and stores it in the local storage of workstation 104, and subsequently registers it at the start of the eApplication.

When execution of the eApplication terminates, the controls 124 are unregistered and removed from the internal storage of workstation 104. The second load type searches the local workstation 104 for the control 124, and loads and registers a control 124 only if the control 124 cannot be found in the local workstation 104 or there is a newer version of the control 124 at the software controls storage module 110. At state 1008, the configuration module 118 retrieves the location information of the software control 124; this information may comprise "ActiveX Resides With Application", "ActiveX Is Located At An URL" and "ActiveX Is On Local Drive" connection type and file location where to retrieve the control, for example. The process then moves to decision state 1010, wherein the configuration module 118 determines the loading type selection for the software control 124. If the selection type is "always register at eApplication start," then the process proceeds to state 1014. Otherwise, the process moves to decision state 1012, wherein the configuration module 118 determines whether the software control 124 is to be loaded from the operating system of the local workstation 104.

If the software control 124 is not in the operating system of the local workstation 104, the process moves to state 1014. At state 1014, the configuration module 118 registers the software control 124 on the local workstation 104. The process then moves to decision state 1016, which is also where the process continues if at decision state 1012 it is determined that the software control 124 is in the operating system of the local workstation 104. At decision state 1016, the configuration module 118 determines whether there is an additional software control 124 to be registered. If that is the case, the process returns to state 1004; otherwise the process ends at state 1018.

Figure 11:
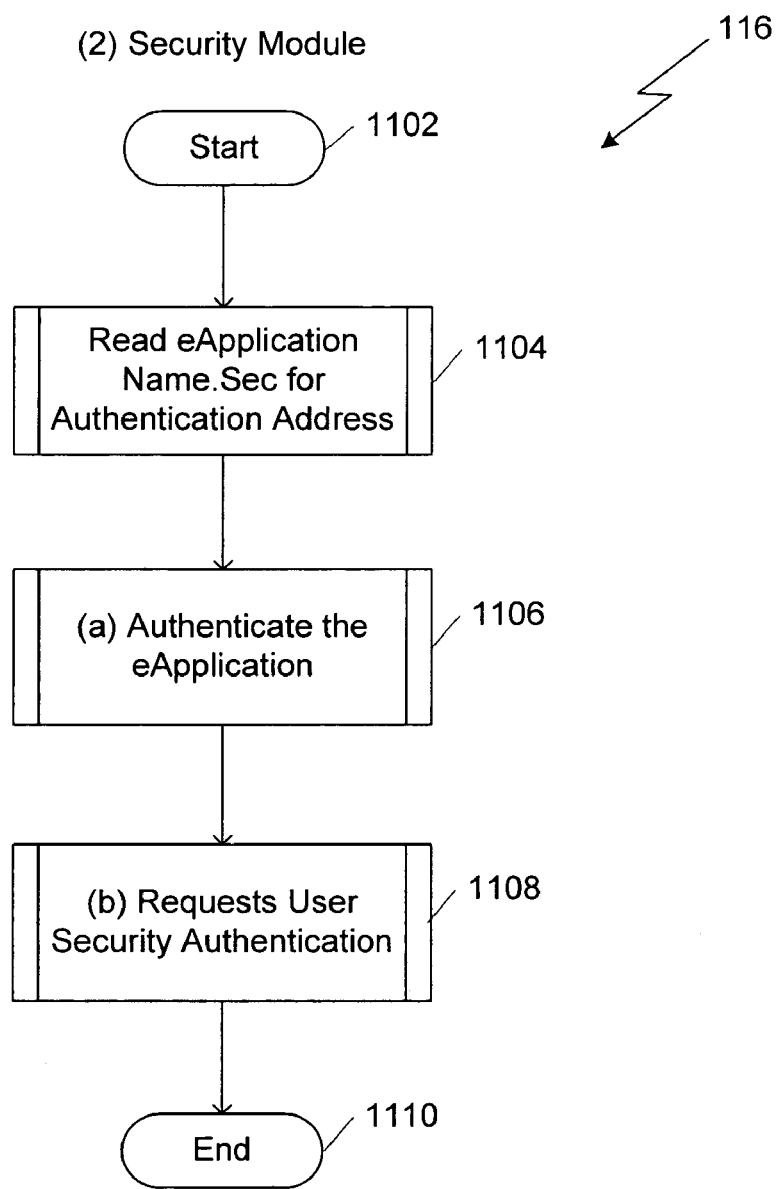
FIG. 11 is a flowchart that illustrates the process executed by the security module shown in FIG. 1.

In one embodiment, the eApplication system may comprise the security module 116. The security module 116 ensures that only authorized users have access to the eApplication system 100. Further, only users with specific permission are allowed to access secure areas of the eApplication system 100. FIG. 11 is a flowchart that illustrates the process executed by the security module 116. The process starts at state 1102. At state 1104, the security module 116 reads the security file 140 to obtain the information necessary for allowing access to the eApplication system 100. At state 1106, the security module 116 authenticates the e-Application (this subprocess is further described below with reference to FIG. 12). The security module 116, at state 1108, requests login information from the user to complete all security authentications (this subprocess is further described below with reference to FIG. 13). The process ends at state 1110.

Figure 12:
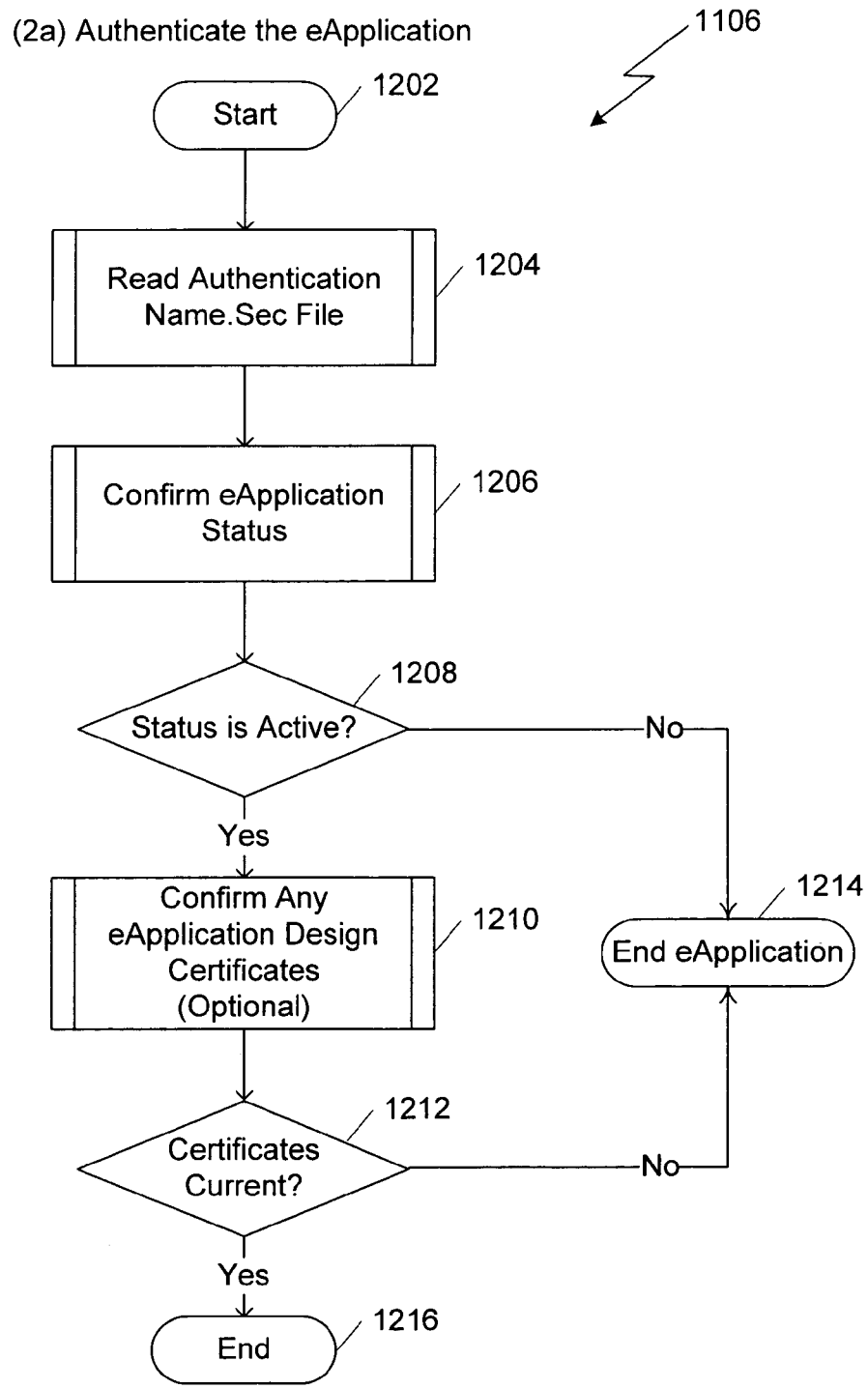
FIG. 12 is a flowchart that expands further on the process of authenticating the eApplication shown in FIG. 11.

FIG. 12 is a flowchart that expands further on the process of authenticating a user to the eApplication (state 1106). In this process the eApplication and remote server 102 exchange digital certificate information that provides for restricted access to the eApplication. The process begins at state 1202, after which the process moves to a state 1204 wherein the security module 116 reads the security file 140. At state 1206, the security module confirms the status of the eApplication. As has already been discussed above with reference to FIG. 1, this feature ensures that the state of the system is "Active," meaning that the user can access it.

For a variety of reasons, an administrator may create an "Inactive" state. In such a case the eApplication displays the relevant status message and terminates execution, thus preventing access to the eApplication. At decision state 1208, the security module 116 determines whether the status of the eApplication is active or inactive. If the eApplication status is active, then at state 1210 the security module 116 may optionally confirm any eApplication design certificates. In one embodiment, the eApplication is configured to issue various object certificates so as to ensure that the local workstation 104 has the proper configuration to execute the eApplication. At decision state 1212, the security module 116 determines whether the certificates are current. If they are, the process of authenticating the eApplication ends at state 1216. If, however, the status of the eApplication is not active, or the certificates are not current, then the eApplication session is terminated at state 1214 and the user is denied access to the application.

Figure 13:
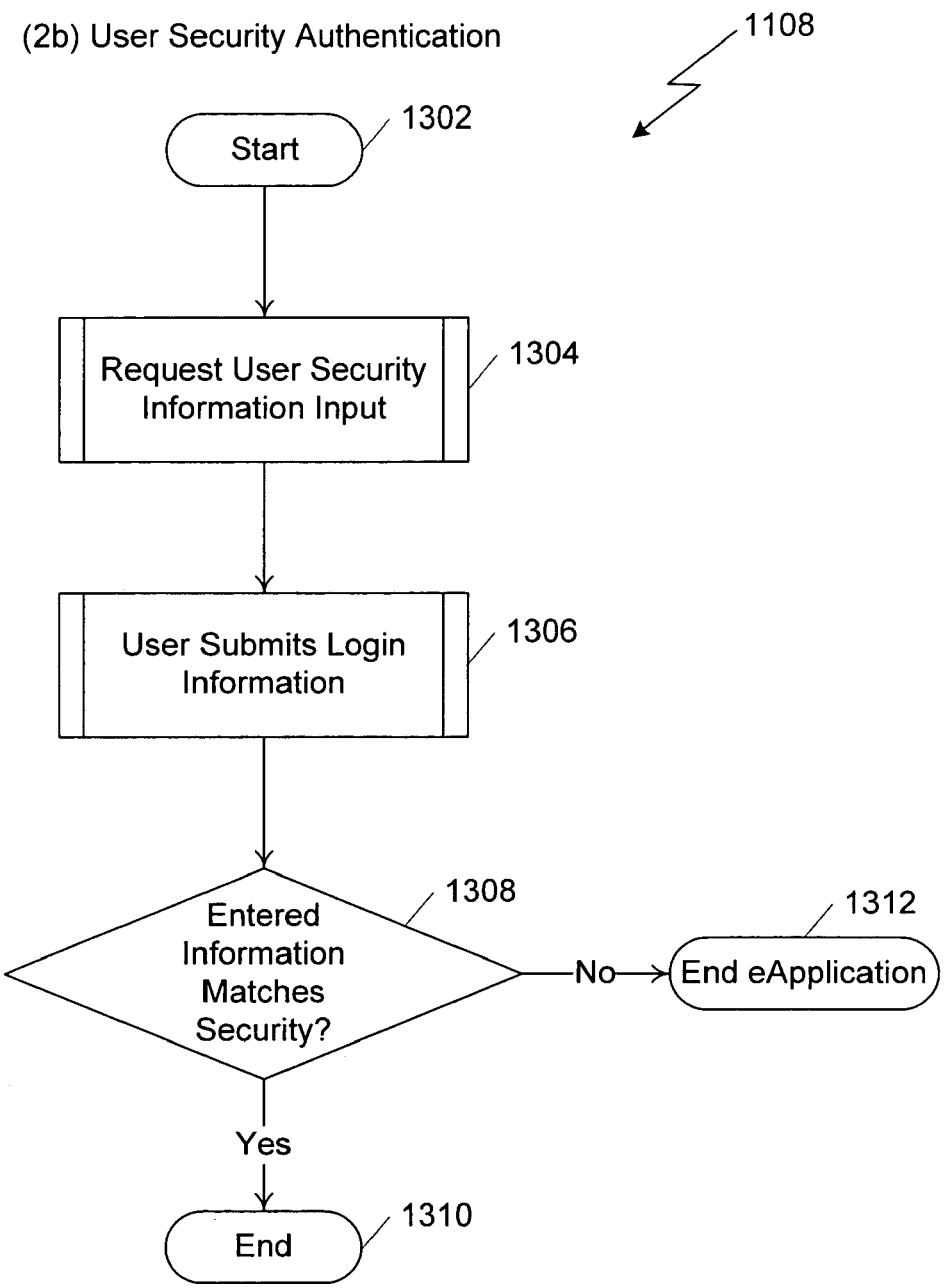
FIG. 13 is a flowchart depicting in greater detail the process of requesting user information for security authentication shown in FIG. 11.

FIG. 13 is a flowchart depicting in greater detail the process of requesting user information for security authentication (state 1108). The process starts at state 1302. At state 1304, the user security module 116 requests user security information data from the user who is attempting to execute a session of the e-Application. This information may include, for example, the user's name and password. The user then submits the requested information at state 1306. In one embodiment, the user may input additional security information to gain access to restricted areas of the eApplication system 100. At decision state 1308, the security module 116 determines whether the user's input matches the security information stored in the security file 140. If the entered information matches, the process ends at state 1310. If, however, the entered information does not match, then the session of the eApplication is ended at state 1312.

Figure 14:
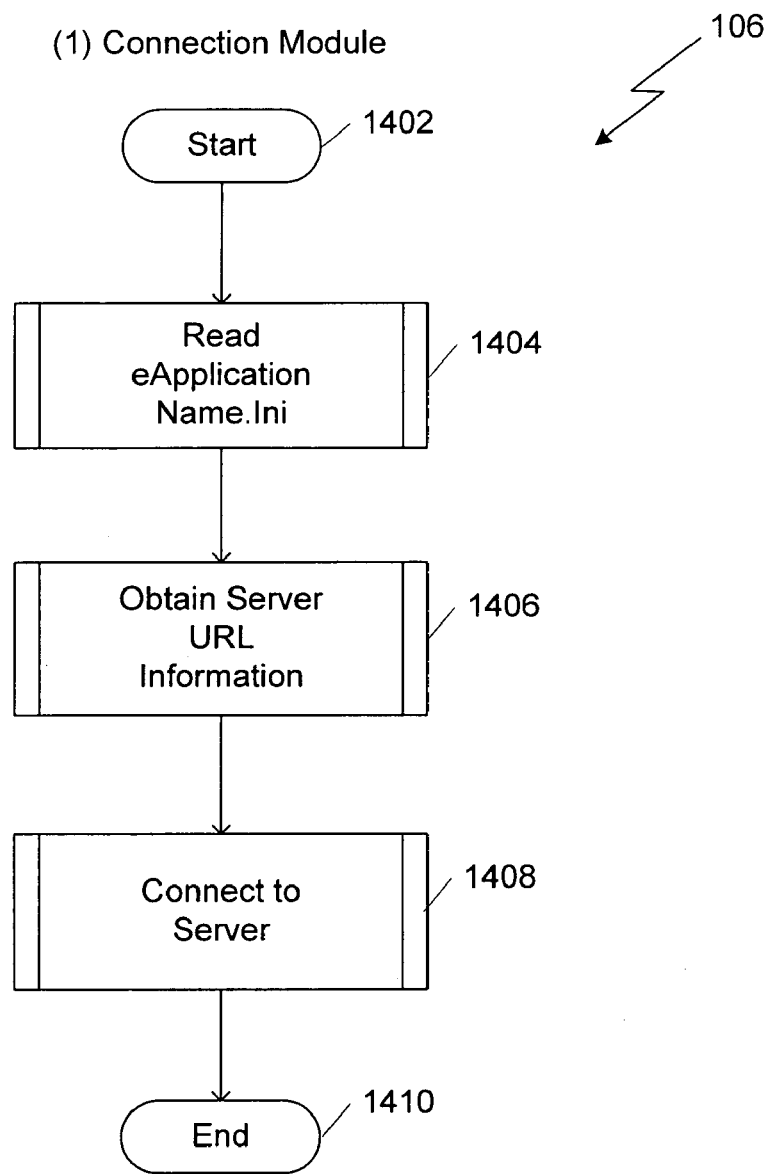
FIG. 14 is a flowchart describing the process executed by the connection module shown in FIG. 1.

FIG. 14 is a flowchart describing the process executed by the connection module 106. The process begins at state 1402. The connection module 106, at state 1404, reads the initialization file 136 located on the local workstation 104. At state 1406, the connection module 106 identifies the location of the remote server 102. If the server is to be accessed via the Internet, for example, the connection module searches for the universal resource locator (URL) information to identify the location of the remote server 102. Having obtained the location information, the connection module 106, at state 1408, then establishes a communication link between the local workstation 104 and the remote server 102. Establishing such a communication link is well known by persons of ordinary skill in the relevant technology. The process then ends at state 1410.

Figure 15:
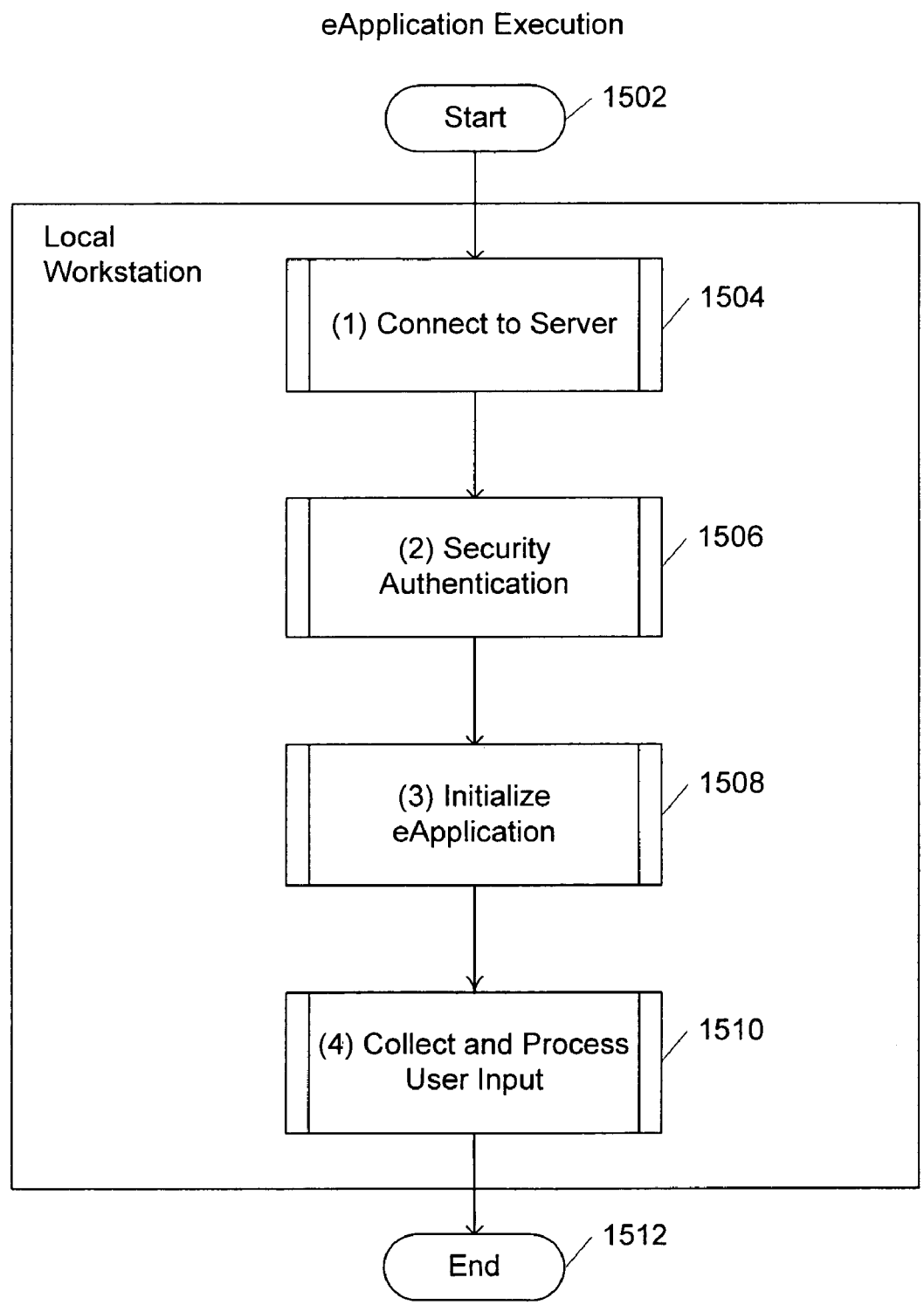
FIG. 15 is a high-level flowchart that illustrates the one process of creating and executing an eApplication with the eApplication system shown in FIG. 1.

Having described the components of a generalized embodiment of the eApplication system 100, we will now describe how the components work together to provide a general eApplication. FIG. 15 is a high-level flowchart that illustrates a process for creating and executing an eApplication. At state 1502, the user launches the eApplication from within the local workstation 104. At state 1504, the connection module 106 establishes a communication link between the local workstation 104 and the remote server 102. At state 1506, the security module 116 authenticates security data in order to grant or deny access by the user to the eApplication system 100. Then, at state 1508, the configuration module 118 creates and initializes the eApplication using the initialization file 136.

At this time the configuration module 118 retrieves from the remote server 102 each electronic page 122 that is to be displayed, and registers every software control 124 needed to implement any one specific eApplication. Finally, at state 1510, the user processing module 120 provides a user interface that includes the browser components for collecting and processing the user input 126.

As already discussed above with reference to FIG. 2, in one embodiment the user processing module 120 presents the user with a tabbed-window interface that displays the downloaded pages. The user then provides input 126, and the software controls 124 and electronic pages 124—coordinated by the internal/external message queues 128 and database queues 130—process the user input 126. Once the user has accomplished the desired task, the process ends at state 1512.

Figure 16:
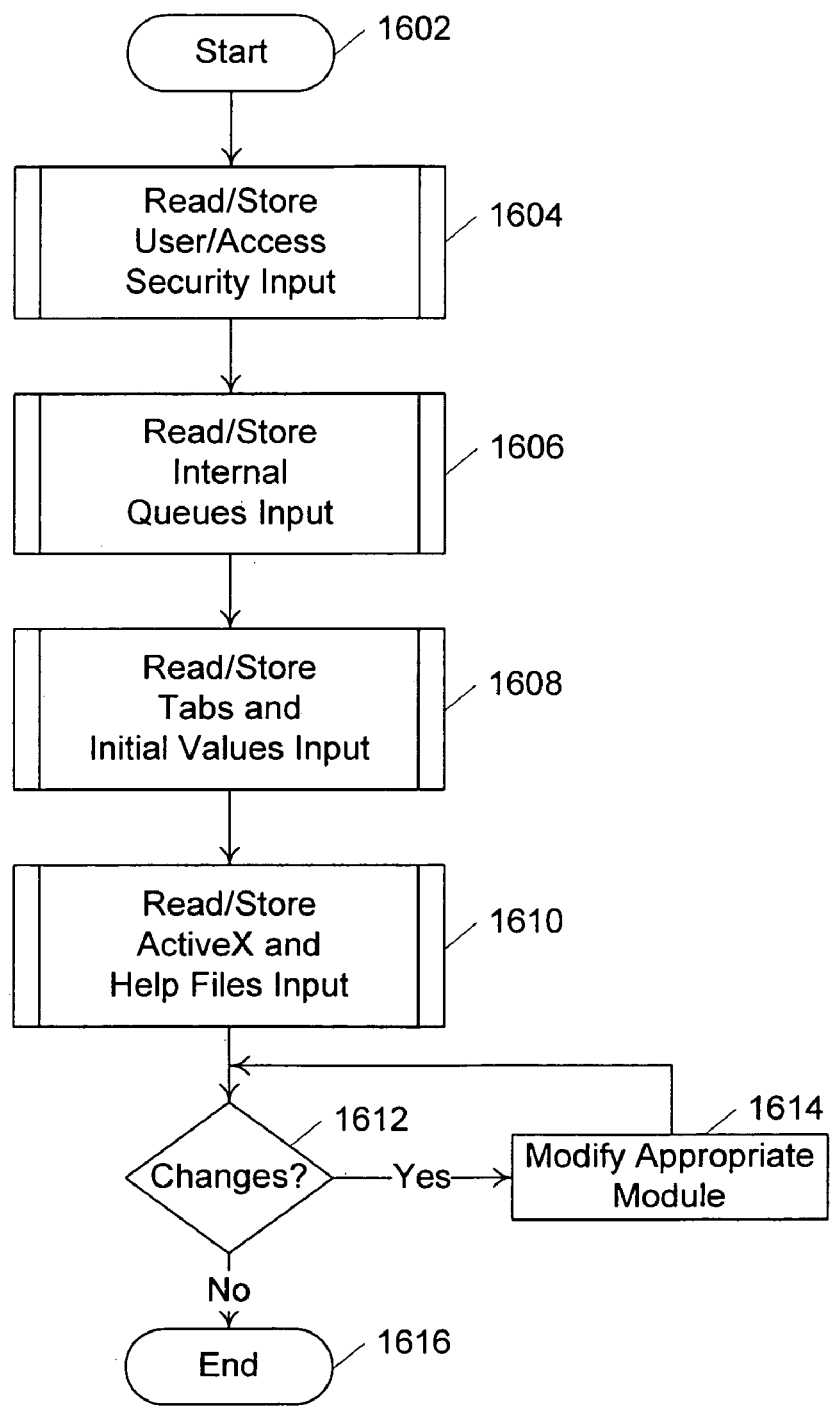
FIG. 16 is a flowchart of the process an eApplication initialization module may use to create the initialization file used by the configuration module of FIG. 1 to construct any one specific eApplication

FIG. 16 is a flowchart of a process an eApplication initialization module may use to create the initialization file 136 used by the configuration module 118 to construct any one specific eApplication. The initialization module may be thought of as a development tool, and as such it may reside anywhere in the eApplication system 100. For example, the initialization module may reside on the local workstation 104 for access by a local administrator or programmer to create, or modify, any specific eApplication. Alternatively, the initialization module may reside on the remote server 102 for access only by the administrator of the remote server 102. In the latter situation, the user of an eApplication may only be interested in using the specific eApplication to accomplish a task, and not interested in designing or modifying the eApplication.

The initialization module may also be implemented in variety of ways. In one embodiment, the designer is provided with a standard Windows interface having well known software controls (e.g., input boxes, push buttons, etc) for accepting input. The process executed by the initialization module starts at state 1602. At state 1604 the eApplication initialization module reads and stores user and access security input. This input may include a list of users, which may have a plurality of properties associated with them, and remote server 102 access information (e.g., a URL, or a DriveLetter:\Folder pointer for LANs, WANs, etc.). The process then moves to state 1606, where the initialization module reads and stores the internal queues input. In one embodiment, there may be, for example, three different queue systems: "Named Pairs", "Messages" and "Database" queues.

At state 1606, the developer may create the maximum number of queues for each queue system. This assures that the eApplication sets aside the proper resources need to execute the specific system design. At state 1608, the initialization module reads and stores information related to the different tabs, along with their initial values, to be part of the specific eApplication. The tab input may include a "Tab Caption," which gives an indication of the functionality of the electronic page 122 and software controls 124 encapsulated by the tab 206. The tab definition also includes the address location for its associated electronic page 122 to be loaded by the configuration module 118 when creating the eApplication. In one embodiment, the tab definition also comprises information about a help file to be associated with that tab 206.

The process proceeds to state 1610 to read and store input for the software controls 124 and Help Files 132. The input for a given software control 124 may include the control's name, the methodology to be used by the configuration module 118 to register the object, and the connection type, i.e., where the control resides (e.g., the local workstation 104 or the remote server 102), so that the configuration module 118 can register it properly. The Help Files 132 input may comprise a file name, the node type (i.e., the descriptive type that defines a given node), the main node name (the name of a group of help files used to create a hierarchical help system), and a connection type (i.e., where the help file resides, local workstation 104 or remote server 102, so that the configuration module 118 can load the information properly). At decision state 1612, the initialization module allows the user to choose to change the data previously read and stored. If changes are to be made, then at state 1614 the appropriate definition module is modified. However, if no changes are to be made, or all modifications have been performed, the process ends at state 1616. The result of this process is the creation of the initialization file 136, which the configuration module 118 uses to implement any one specific eApplication.

Having described the components and the operation of the eApplication system 100 in general terms, we will now illustrate the eApplication system 100 with an example of a Payroll System eApplication. It is to be understood that the example of the Payroll System is used here only for illustrative purposes, and is in no way intended to limit the scope of the invention to only this type of eApplication. In fact, the eApplication system 100 may be used to implement a great variety of specific applications, such as, for example, a tax returns filing system, a library catalogue system, a sales/purchase and inventory control management system, etc.

Figure 17:
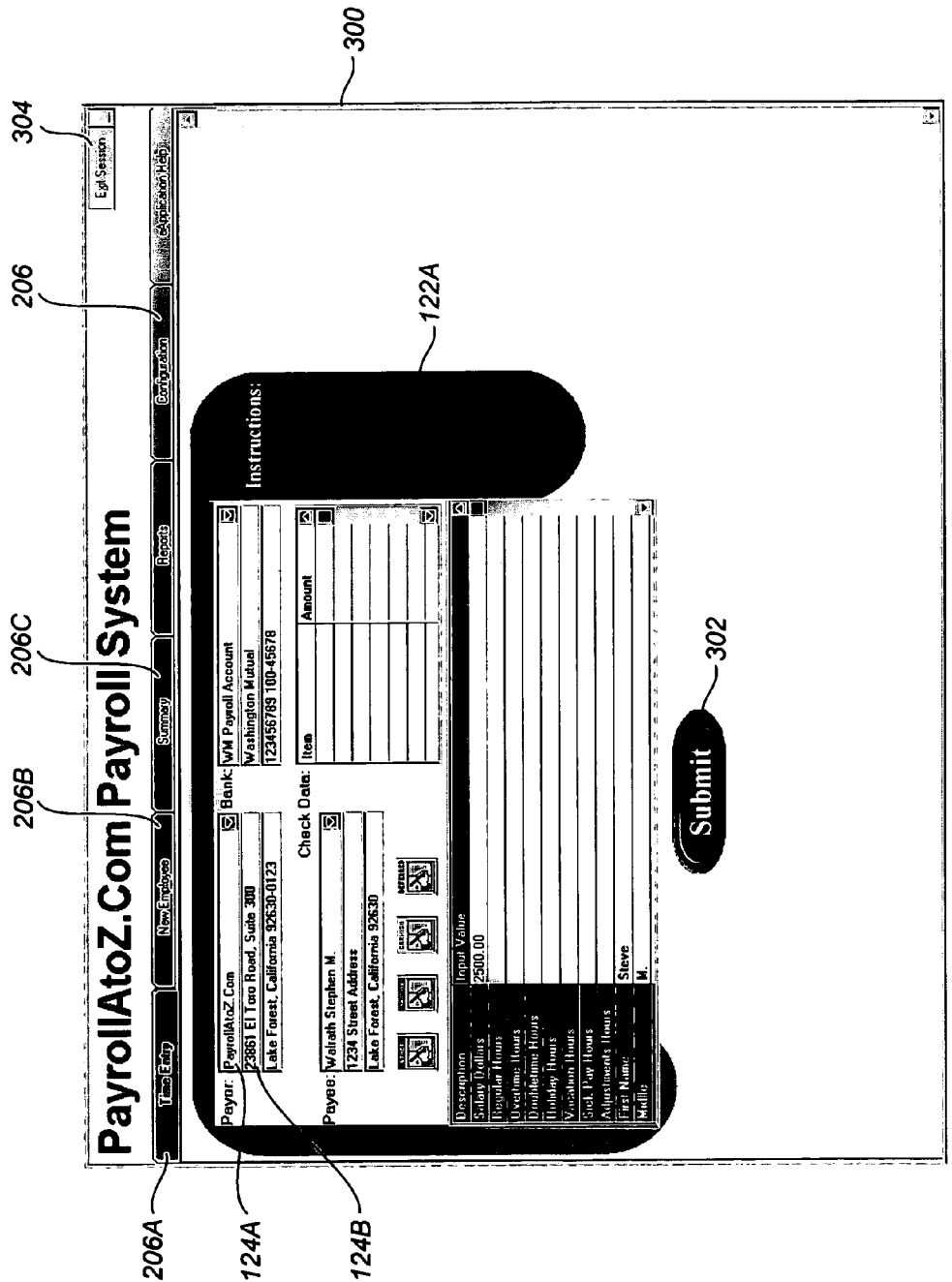
FIG. 17 is a screen capture depicting one specific embodiment of an eApplication with a typical user interface window having a plurality of tabs.

FIG. 17 is a screen capture illustrating a specific eApplication having a user interface window 300 displaying a plurality of tabs 206. In this example there are six tabs 206, namely Time Entry, New Employee, Summary, Reports, Configuration, and eApplication Help. FIG. 3 shows a typical tab 206A (Time Entry) as the active tab 206. The tab 206A comprises an electronic page 122A with associated software controls 124A (a list box) and 124B (a text box), for example. In one embodiment, all of the software controls 124 shown may be constructed as a single software control 124, say, for example, the software control 124 "Time Entry."

The types and number of software controls 124 associated with any given tab 206 may vary and are usually determined by the specific design features of any given eApplication. A user provides user input 126 to any of the controls 124 or the electronic page 122A by selecting the appropriate control with a cursor. As shown here, the user input 126 comprises Payor, Payee, Bank, Check, and other information related to computing a payment and generating a check for an employee. After entering data into this window, the user may choose to perform a different task, such as entering a New Employee record by choosing tab 206B, or may submit user input 126 for processing by clicking on the Submit button 302.

If the user selects the Submit button 302, the electronic page 122A and the software controls 124 process the user input 126. The processing of the user input 126 is coordinated by the database queues 130 and the internal/external message queues 128. For example, the software control "Time Entry" may write each employee's information to the database 128. Internal queue messages 128 are then sent to the software controls 124 encapsulated by the "Summary" tab 206C, where the user input 126 would be entered for review. Additionally, internal queue messages 128 would be sent to the eApplication to be stored in the database queue 130. The user input 126 may be transmitted to remote server 102, or may be stored in database module 112, or both. At this point the user may select another tab 206, or may end the eApplication session by clicking on the Exit Session button 304.

Figure 18:
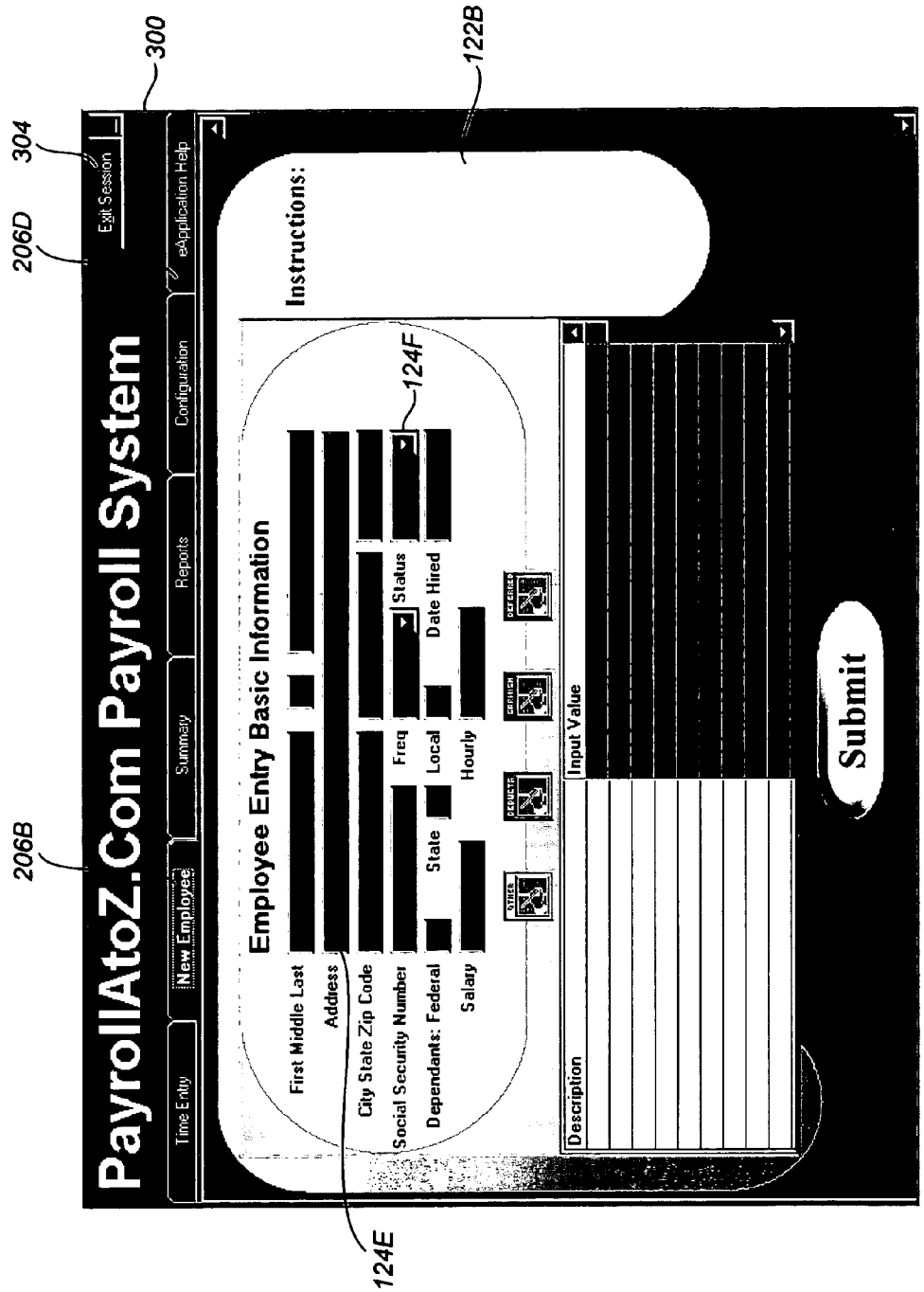
FIG. 18 is a screen capture depicting the same user interface window of FIG. 17, with a different active tab.

FIG. 18 depicts the same user interface window 300 of FIG. 17, but it shows tab 206B New Employee as the active tab 206. An electronic page 122B is shown having associated software controls such as a text box 124E for entering user input 126 related to the address of an employee. In addition, a list box 124F for receiving user input 126 relating to the status of the employee is shown. In all other respects, the user processing module 120 manages the tab 206—and its associated electronic page 122B and software controls 124E and 124F—and operates in the same manner as described above with respect to tab 206A.

FIG. 18 thus provides a further example of another tab 206, so as to convey the idea of how an eApplication uses a plurality of tabs 206 to activate and change the browser components that display pages within a complex system, such a Payroll System. The other tabs 206 (Summary, Reports, and Configuration) are managed, and behave, similarly to those already described above. The only tab 206 that is different from the others is tab 206D eApplication Help, which typically does not process user input 126. Rather, tab 206D simply responds to user input 126 by providing software objects and instructions as to, for example, the meaning of any of the terms shown in the window 300.

eApplication Pseudocode Example

A. Form Load—Events Processed Prior to Displaying eApplication
  1. Determine if eWebAppl.Spl resides in start up directory
     Yes—Load contents to modify "Splash" form's Name, Company Name, and Telephone number.
  2. Show "Splash" form to user.
  3. Process "ReadInitialize" procedure.
     a. Find eApplication's application folder (where executable is located).
     b. Find "Windows System" folder (c:\windows\system32, c:\winnt,system32 etc)
     c. Find "Temporary" folder for workstation (c: \temp, c: \user\Local\tmp, etc)
     d. Find security user ID from the security file
     e. Find FTP user name and password from the FTP transfer file
     f. Open the INI file for this eApplication (XML document created by the developer utilizing eAppsIni executable)
        1) Read Program variables—eApplication Name, URL Connection, Location at URL, Number of internal queues, and Number of message queues.
        2) Using FTP connect to URL and retrieve security file and verify current status is "Current" which allows user to continue. If status is any other value the eApplication is terminated with a message to the user that security could not be authenticated.
        3) Create internal messages queues using the number of queues from 1).
        4) Read each ActiveX control that needs to be registered that is utilized by other components.
        5) Determine registry methodology.
           a) Register control each time the application starts.
           b) Register control only if not in the "Windows System" directory.
        6) Read information about each "Tab Control", Caption, Help ID, Help File Name, Connection, and Location of Help File.
        7) Read information about database queues and the number of columns to set aside for each row.
        8) Read information concerning each eApplication "Help File" that will be attached to the eApplication and displayed in the "Help Tab". Reads Name, Help Text, Node Type, Node Name, Sub Node Name, Image Number, Connection Type, Connection and Location.
        9) Reads "Internal Named Pairs" that are being passed to the eApplication. Data read is Name and Value for each named pair.
        10) Read information for each user's security. Data read is User Name, Full Name, Password, and User Description.
        11) INI file read is completed and closed.

12) Using FTP read the security file at The URL Connection and Location specified in 1) above. Retrieve additional user information and named pairs that the developer has posted.
13) Create a "Message Queue" for each ActiveX control registered in 4) and 5) above.
14) Look at "Internal Named Pairs" for specific information as it relates to this specific eApplication formats. This information could be (but not limited to) "Splash" form information, eApplication colors, bitmaps, and various text.
15) Run additional programs that may be required to execute before the eApplication can execute its functions (if applicable).
4. Create the "Tab Controls" that will be used for the eApplication screen displayed to the user.
  a. Create each tab with proper descriptive information.
  b. Create the eApplication "Help Tab".
  c. Load a "Microsoft Web Browser Control" for each tab (except Help) and attach to the Tab".
  d. Determine number of tabs to display per row. Maximum of 16 tabs are allowable and 8 tabs per row.
5. Create the "Help Tab" by reading its information and assigning to:
  a. Top level node—Help for the entire eApplication.
  b. Parent level nodes—Help for specific topics.
  c. Child level nodes—The various help files for each parent node.
6. Size the eApplication to fit the user environment. Determines Top, Left, Width, and Height of components.
7. Create screens by loading graphic for top of the eApplication display (if applicable) or present text to the display area. Set the eApplication's background color.
8. Send messages to the controls by reading initialization "Internal Named Pairs" and determining if a message should be posted for components. Used for passing information to ActiveX or other components that require information from this eApplication.
9. "Splash" form is changed to display user "Sign In" information. User must supply a valid user name and password.
10. Upon successful "Sign In" this information is posted to each component's message queue.
11. Display the "Help Tab" and "Splash" form to the user.
12. Load each "Microsoft Web Browser Control" for each tab from the connection and location information supplied by the INI file.
13. Unload the "Splash" form and display the first tab.
14. Set the timer interval for message queue processing. While eApplication is running it will transfer information from one message queue to another. This allows messages to be passed from one component to another.
15. Set the timer interval for reading eApplication's specific message queue. This allows other components to send information back to the eApplication for processing.

B. eApplication Execution
1. Exit button is displayed to end the eApplication session.
  a. Closes and removes all message queues.
  b. Closes and removes all database queues.
  c. Runs additional programs prior to eApplication terminating (if applicable).
  d. End the eApplication session.
2. A minimize button is displayed to move the eApplication to the task bar.
3. The message queue timers are triggered in the specified number of milliseconds and messages are moved from component to component.
  a. Open each message queue for processing.
  b. Read each open item and move it to the respective queue.
  c. Close each message queue.
  d. For eApplication's queue determine if a message has been posted and execute the instruction.
4. The user can click each "Tab" control displayed to access each "Microsoft Web Browser Control" or the "Help Tab". The eApplication does no processing of this information, it is the developers responsibility to build functionality to each "Tab". The eApplication is a container allowing for simultaneous display of several "Microsoft Web Browser Controls" and allow a platform for communication between each of these components.

CONCLUSION

While the above detailed description has shown, described, and pointed out novel features of the invention as applied to various embodiments, it will be understood that various omissions, substitutions, and changes in the form and details of the device or process illustrated may be made by those skilled in the relevant technology without departing from the spirit of the invention. The scope of the invention is indicated by the appended claims rather than by the foregoing description. All changes which come within the meaning and range of equivalency of the claims are to be embraced within their scope.

What is claimed is:

1. A system for providing a distributed software application, comprising:
  a server comprising a stored electronic page, wherein the page comprises a first browser component configured to display a first electronic page and a second browser component configured to display a second electronic page within the stored electronic page;
  a client computer comprising a browser program configured to establish a communication link with the server, download said first and second electronic pages, and display the stored electronic page, wherein said first browser component is active and displays said first electronic page to a user, and said second browser component is inactive and does not display said second electronic page to the user; and
  at least one software control on the stored electronic page for selecting between said first browser component and said second browser component, wherein selecting said first browser component results in said first electronic page being displayed to the user and said second electronic page becoming hidden from said user and wherein selecting said second browser component results in said second electronic page being displayed to the user and said first electronic page becoming hidden from said user.

2. The system of claim 1, wherein the stored electronic page is written in the Hypertext Markup Language (HTML).

3. The system of claim 1, wherein the first and second browser components comprise the Microsoft HTML parsing and rendering engine.

4. The system of claim 1, wherein The browser program is the Microsoft Internet Explorer browser program.

5. The system of claim 1, wherein the software control is an Active X control.

6. The system of claim 5, wherein the Active X control is a command button control.

7. The system of claim 5, wherein the Active X control appears as a tab within the browser program, and wherein the electronic main page displays a first tab associated with the first browser component and a second tab associated with the second browser component.

8. The system of claim 1, wherein the software control is configured to store variable data to the client computer.

9. The system of claim 1, wherein the first and second browser components are part of a single software control.

10. A method of processing information using a computer network, comprising:
    downloading an electronic page from a server computer to a client computer, wherein the downloaded electronic page comprises a first browser component configured to display a first electronic page and a second browser component configured to display a second electronic page within the downloaded electronic page;
    providing at least one software control on the downloaded electronic page for selecting between said first and second browser components;
    downloading said first electronic page and said second electronic page to said client computer; and
    displaying the downloaded electronic page, wherein said first browser component is active and displays said first electronic page, and said second browser component is inactive and does not display said second electronic page, and wherein activation of the software control results said second browser component becoming active and displaying said second electronic page.

11. The method of claim 10, wherein the downloaded electronic page is written in the Hypertext Markup Language (HTML).

12. The method of claim 10, wherein the first and second browser components comprise the Microsoft HTML parsing and rendering engine.

13. The method of claim 10, wherein the browser program is the Microsoft Internet Explorer browser program.

14. The method of claim 10, wherein the software control is an Active X control.

15. The method of claim 14, wherein the Active X control is a command button control.

16. The method of claim 14, wherein the Active X control appears as a tab within the browser program, and wherein the downloaded electronic page displays a first tab associated with the first browser component and a second tab associated with the second browser component.

17. The method of claim 10, wherein the software control stores variable data to the client computer.

18. The method of claim 10, wherein the first and second browser components are part of a single software control.

19. In a computer readable storage, an electronic page configured to display a plurality of electronic web pages to a user on a computer desktop, comprising:
    a first browser component configured to download and display a first web page to the user;
    a second browser component configured to download and display a second web page to the user;
    a first software control configured to activate said first browser component and display said first web page in a front position on said desktop, wherein said first software control deactivates and makes hidden said second browser component and said second web page; and
    a second software control configured to activate said second browser component and display said second web page in a front position on said desktop, while deactivating and hiding said first browser component and said first web page.

20. The electronic main page of claim 19, wherein said first software control and said second software control are tab controls.

21. The system of claim 1, wherein the browser program is configured to download said first and second electronic pages substantially simultaneously.

22. The system of claim 1, wherein said client computer comprises a queue for storing data that is to be communicated from said first browser component to said second browser component.

23. The system of claim 22, wherein said system is configured to read said data at predetermined time intervals.

24. In a computer readable storage, an Internet browser program for displaying electronic pages on a computer display, comprising:
    a first browser component configured to display a first electronic page;
    a second browser component configured to display a second electronic page;
    a first tab control configured to display said first electronic page and hide said second electronic page; and
    a second tab control configured to display said second electronic page and hide said first electronic page.

25. The program of claim 24, wherein said program comprises an accounting program.

26. The program of claim 24, wherein said internet browser program is configured to download said first electronic page and said second electronic page substantially simultaneously.

27. The program of claim 24, wherein said first tab control is configured to move said first browser component to a front position on said computer display.

28. The program of claim 24, wherein said second tab control is configured to move said second browser component to a front position on said computer display.

* * * * *